USO09268045B2

(12) United States Patent
Nakamura et al.

(10) Patent No.: US 9,268,045 B2
(45) Date of Patent: Feb. 23, 2016

(54) NEUTRON DETECTOR

(71) Applicants: Japan Atomic Energy Agency, Ibaraki (JP); Chichibu Fuji Co., Ltd., Saitama (JP); Masaki Katagiri, Mito-shi, Ibaraki (JP)

(72) Inventors: Tatsuya Nakamura, Tokai (JP); Noriaki Tsutsui, Chichibu (JP); Atsushi Sakaue, Chichibu (JP); Masaki Katagiri, Mito (JP)

(73) Assignees: Japan Atomic Energy Agency, Ibaraki (JP); Chichibu Fuji Co., Ltd., Saitama (JP); Masaki Katagiri, Mito-shi (JP)

( * ) Notice: Subject to any disclaimer, the term of this patent is extended or adjusted under 35 U.S.C. 154(b) by 0 days.

(21) Appl. No.: 14/502,698

(22) Filed: Sep. 30, 2014

(65) Prior Publication Data

US 2015/0097122 A1  Apr. 9, 2015

(30) Foreign Application Priority Data

Oct. 4, 2013 (JP) .................................. 2013-208708

(51) Int. Cl.
*G01T 3/06* (2006.01)
(52) U.S. Cl.
CPC ......................................... *G01T 3/06* (2013.01)
(58) Field of Classification Search
CPC ........................................................ G01T 1/203
USPC ..................................... 250/367, 368, 390.11
See application file for complete search history.

(56) References Cited

U.S. PATENT DOCUMENTS

| 7,335,891 B2 * | 2/2008 | Kniss .................... G01T 3/06 250/370.11 |
| 2003/0160178 A1 * | 8/2003 | Katagiri .................. 250/390.11 |
| 2012/0032087 A1 * | 2/2012 | Sugihara .................. 250/367 |

FOREIGN PATENT DOCUMENTS

| JP | 2000-065937 A | 3/2000 |
| JP | 2000-187077 A | 7/2000 |

(Continued)

OTHER PUBLICATIONS

N.J. Rhodes et al. "Pixelated neutron scintillation detectors using fibre optic coded arrays", Nuclear Instruments and Methods in Physics Research A 392 (1997) pp. 315-318.

(Continued)

*Primary Examiner* — David Porta
*Assistant Examiner* — Faye Boosalis
(74) *Attorney, Agent, or Firm* — Brundidge & Stanger, P.C.

(57) ABSTRACT

A neutron detector with a unique neutron detecting element is disclosed. The neutron detecting element has an inner cylindrical neutron scintillator where a neutron detection body including a ZnS phosphor, and a neutron converter material which contains $^6$Li or $^{10}$B is arranged outside of the cylindrical substrate; a scintillator fluorescence detection body made by placing coiled wavelength shift fibers where two wavelength shift fibers are wound in parallel along the cylindrical substrate on said inner cylindrical neutron scintillator; and an outer cylindrical neutron scintillator where a neutron detection body is arranged inside of the cylindrical substrate, the outer cylindrical neutron scintillator being arranged on the scintillator fluorescence detection body. The fluorescence signals converted into pulse signals by two optical detectors are led to a coincidence circuit, and when two fluorescence signals are measured simultaneously during the predetermined period of time, a neutron signal is output.

4 Claims, 16 Drawing Sheets

(56) References Cited

FOREIGN PATENT DOCUMENTS

| JP | 2002-071816 A | 3/2002 |
|----|---------------|--------|
| JP | 2011-141239 A | 7/2011 |
| JP | 2011179863    | 9/2011 |

OTHER PUBLICATIONS

"Poissonian-type new radiation imager" Kei-Ichi Kuroda, et al., Nuclear Instruments and Methods in Physics Research A 430(1999) 311-320.

"Detecting Ionizing Radiation in Liquid Helium Using Wavelength Shifting Light Collection" D.N. McKinsey, et al., Nuclear Instruments and Methods in Physics Research A 516 (2004) 475-485.

"Scintillation Counter with MRS APD Light Readout" A. Akindinov, et al., Nuclear Instruments and Methods in Physics Research A 539 (2005) 172-176.

* cited by examiner

FIG.16

| CHANNEL | OPTICAL FIBER 1 | OPTICAL FIBER 2 | CHANNEL | OPTICAL FIBER 1 | OPTICAL FIBER 2 | CHANNEL | OPTICAL FIBER 1 | OPTICAL FIBER 2 |
|---|---|---|---|---|---|---|---|---|
| 1 | 1 | 2 | 41 | 3 | 15 | 81 | 7 | 13 |
| 2 | 1 | 3 | 42 | 3 | 16 | 82 | 7 | 14 |
| 3 | 1 | 4 | 43 | 4 | 5 | 83 | 7 | 15 |
| 4 | 1 | 5 | 44 | 4 | 6 | 84 | 7 | 16 |
| 5 | 1 | 6 | 45 | 4 | 7 | 85 | 8 | 9 |
| 6 | 1 | 7 | 46 | 4 | 8 | 86 | 8 | 10 |
| 7 | 1 | 8 | 47 | 4 | 9 | 87 | 8 | 11 |
| 8 | 1 | 9 | 48 | 4 | 10 | 88 | 8 | 12 |
| 9 | 1 | 10 | 49 | 4 | 11 | 89 | 8 | 13 |
| 10 | 1 | 11 | 50 | 4 | 12 | 90 | 8 | 14 |
| 11 | 1 | 12 | 51 | 4 | 13 | 91 | 8 | 15 |
| 12 | 1 | 13 | 52 | 4 | 14 | 92 | 8 | 16 |
| 13 | 1 | 14 | 53 | 4 | 15 | 93 | 9 | 10 |
| 14 | 1 | 15 | 54 | 4 | 16 | 94 | 9 | 11 |
| 15 | 1 | 16 | 55 | 5 | 6 | 95 | 9 | 12 |
| 16 | 2 | 3 | 56 | 5 | 7 | 96 | 9 | 13 |
| 17 | 2 | 4 | 57 | 5 | 8 | 97 | 9 | 14 |
| 18 | 2 | 5 | 58 | 5 | 9 | 98 | 9 | 15 |
| 19 | 2 | 6 | 59 | 5 | 10 | 99 | 9 | 16 |
| 20 | 2 | 7 | 60 | 5 | 11 | 100 | 10 | 11 |
| 21 | 2 | 8 | 61 | 5 | 12 | 101 | 10 | 12 |
| 22 | 2 | 9 | 62 | 5 | 13 | 102 | 10 | 13 |
| 23 | 2 | 10 | 63 | 5 | 14 | 103 | 10 | 14 |
| 24 | 2 | 11 | 64 | 5 | 15 | 104 | 10 | 15 |
| 25 | 2 | 12 | 65 | 5 | 16 | 105 | 10 | 16 |
| 26 | 2 | 13 | 66 | 6 | 7 | 106 | 11 | 12 |
| 27 | 2 | 14 | 67 | 6 | 8 | 107 | 11 | 13 |
| 28 | 2 | 15 | 68 | 6 | 9 | 108 | 11 | 14 |
| 29 | 2 | 16 | 69 | 6 | 10 | 109 | 11 | 15 |
| 30 | 3 | 4 | 70 | 6 | 11 | 110 | 11 | 16 |
| 31 | 3 | 5 | 71 | 6 | 12 | 111 | 12 | 13 |
| 32 | 3 | 6 | 72 | 6 | 13 | 112 | 12 | 14 |
| 33 | 3 | 7 | 73 | 6 | 14 | 113 | 12 | 15 |
| 34 | 3 | 8 | 74 | 6 | 15 | 114 | 12 | 16 |
| 35 | 3 | 9 | 75 | 6 | 16 | 115 | 13 | 14 |
| 36 | 3 | 10 | 76 | 7 | 8 | 116 | 13 | 15 |
| 37 | 3 | 11 | 77 | 7 | 9 | 117 | 13 | 16 |
| 38 | 3 | 12 | 78 | 7 | 10 | 118 | 14 | 15 |
| 39 | 3 | 13 | 79 | 7 | 11 | 119 | 14 | 16 |
| 40 | 3 | 14 | 80 | 7 | 12 | 120 | 15 | 16 |

NEUTRON DETECTOR

BACKGROUND OF THE INVENTION

The present invention relates to a neutron detector which can be effectively used for instance in the field of a neutron scattering experiment in which a neutron source which uses a nuclear reactor or a particle accelerator, etc. or various nuclear security.

A cylinder type $^3$He gas proportional counter or a position-sensitive $^3$He gas proportional counter has been chiefly used as a neutron detector so far.

Especially, a position-sensitive $^3$He gas proportional detector which has been used as a one-dimensional detector has great advantages that the position of incidence of a neutron can be obtained easily by giving resistance to a core wire by which signals are collected, measuring the signals at both ends of the core wire and processing the signals, and neutron detection efficiency can be improved by increasing the pressure of $^3$He gas. And, the sensitivity of gamma rays which form the background is low. In addition, this counter tube was indispensable in a neutron scattering experimental apparatus which had to arrange the one-dimensional neutron detector in a vacuum tank, because it has simple construction and excellent vacuum-proof.

On the other hand, $^3$He gas multi-wire two-dimensional neutron detector etc. have been used as a neutron image detector used in the neutron scattering experimental apparatus which does not need the vacuum-proof.

Moreover, the detector which detects a one-dimensional or a two-dimensional neutron image by coding the position of incidence of the fluorescence emitted from $^6$Li glass scintillator or ZnS/$^6$LiF half transparent type neutron scintillator, etc. by using optical fibers or wavelength shift fibers, and detecting it by a photomultiplier tube has been used as a neutron image detector with a scintillator. In addition, as radiation detectors other than the neutron detector which adopts the scintillator or the wavelength shift fiber, the following radiation detectors have been used, that is, (1) a radiation detector comprised of a combination of a liquid He scintillator, a TPB wavelength converter and one coiled wavelength shift fiber, (2) a radiation detector comprised of a combination of a plastic scintillator and a ring wavelength shift fiber, and (3) a radiation detector comprised of a combination of a cylindrical scintillator and a wavelength shift fiber built therein.

In these detectors, the fluorescence emitted from an only transparent scintillator is finally collected to one place by using wavelength shift fibers, and the signal processing is carried out by one optical detector to detect the radiation. Accordingly, it was very difficult to apply such a radiation detection method in which these wavelength shift fibers are used to the neutron detector requiring a high detection efficiency in which the ZnS/$^6$LiF half transparent type neutron scintillator, etc. are used and the sensitivity of gamma rays which form the background have to be reduced.

[PATENT DOCUMENT 1] JP2000-187077A
[PATENT DOCUMENT 2] JP2002-071816A
[PATENT DOCUMENT 3] JP2011-141239A
[PATENT DOCUMENT 4] JP2000-065937A
[NON-PATENT LITERATURE 1] Nucl. Instr. and Meth., A430(1999)311-320
[NON-PATENT LITERATURE 2] Nucl. Instr. and Meth., A516(2004)475-485
[NON-PATENT LITERATURE 3] Nucl. Instr. and Meth., A539(2005)172-176

BRIEF SUMMARY OF THE INVENTION

It is difficult from the configuration problem to use the conventional neutron image detector in which the fluorescence emitted from the ZnS/$^6$LiF half transparent type neutron scintillator etc. is coded by the optical fiber or the wavelength shift fiber in vacuo. Moreover, neutron detection efficiencies are also inferior to the efficiency of the mainstream positional sensitive $^3$He gas proportional counter because there is a limit in the thickness of the scintillator now. Therefore, it was very difficult to use it as a neutron image detector used for the neutron scattering experimental apparatus which includes the detector with a high detection efficiency in a big vacuum tank in order to use under high vacuum in the neutron scattering research facilities where the neutron source which uses a nuclear reactor or a particle accelerator, etc.

It became difficult to obtain $^3$He gas due to the changes in the international situation in addition to such a detector development situation, and the price increased by several ten times. Accordingly, buying and using a large amount of $^3$He gas are in a very difficult situation. Moreover, it is assumed that $^3$He gas will decrease from various circumstances in the future and the recovery of production will be not able to expect, because $^3$He gas is produced by separating $^3$He obtained by decay based on tritium having the half-life of 12 years. Therefore, $^3$He substitution neutron detector is needed in the world now, and dynamic development is currently underway.

An object of the present invention is to provide a neutron detector of a new type, which has the neutron detection efficiency substantially equal to that of the conventional position-sensitive $^3$He gas proportional counter without the use of the unacquirable $^3$He gas.

In the present invention, half transparent type neutron scintillator where a neutron detection body which includes a ZnS phosphor and a neutron converter material which contains $^6$Li or $^{10}$B is arranged is used to detect the neutron. ZnS phosphor mixed with $^6$LiF is used as a neutron scintillator for over 60 years because the sensitivity of ZnS to the gamma ray is low. However, there was a limit in thickening to improve the neutron detection efficiency because of half transparent type neutron scintillator.

The neutron detecting element used in the present invention has the sandwich structure. That is, the neutron detecting element comprises: an inner cylindrical neutron scintillator where a neutron detection body which includes a ZnS phosphor and a neutron converter material which contains $^6$Li or $^{10}$B is arranged outside of the cylindrical substrate; a scintillator fluorescence detection body made by placing coiled wavelength shift fibers where two wavelength shift fibers are wound in parallel along the cylindrical substrate on an inner cylindrical neutron scintillator; and an outer cylindrical neutron scintillator where a neutron detection body which includes a ZnS phosphor and a neutron converter material which contains $^6$Li or $^{10}$B is arranged inside of the cylindrical substrate, the outer cylindrical neutron scintillator being arranged on the scintillator fluorescence detection body. In this structure, the neutron incident on the neutron detecting element is detected by 4 half transparent type neutron scintillators. Therefore, when the neutron scintillator with the detection efficiency of 40% to the thermal neutron is used, it becomes possible to obtain ideally a high detection efficiency of 87%, and thus the detection efficiency equal with that of the current 6 atmospheric pressure one inch position-sensitive $^3$He gas proportional counter can be obtained. Moreover, the conventional photon measurement method is used in the signal processing, because in the neutron detector in which the half transparent type neutron scintillator and the wavelength shift fiber are combined, it is necessary to make the neutron detector to a high detection efficiency by effectively using the fluorescence emitted from the scintillator (For instance, see JP 2011-179863 A).

The gamma ray sensitivity of ZnS phosphor is originally low. Therefore, the gamma sensitivity of detector itself is significantly dependent on the detection effect of gamma rays due to the wavelength shift fiber. Therefore, the gamma detection sensitivity due to the wavelength shift fiber is decreased by measuring based on the coincidence of two wavelength shift fibers.

Moreover, to improve the position resolution which is important as the performance of a positional sensitive neutron detector, the round-shaped neutron shield is installed. In the case of two or more neutron detecting elements are arranged in the cylinder for neutron detecting element arrangement, when the neutron is incident on the edge of the neutron detecting element. The neutron leakage detection is caused by the neutron incident on the next neutron detecting element, and thus the position resolution is deteriorated. The deterioration in the position resolution is obstructed by arranging the round-shaped neutron shield having a round hole, through which the wiring for the optical fiber is enabled between each neutron detecting elements. Moreover, because a lot of hydrogen atoms are possessed when the plastic optical fiber is used as an optical fiber used to wire in the cylinder for neutron detecting element arrangement, the incident neutron is scattered. This round-shaped neutron shield has the function to prevent the scattered neutron from outputting different position information by the incidence on the next neutron detecting element.

Moreover, when the number of neutron detection increases, the cost of making the neutron detector and the one-dimensional neutron detector according to the present invention increases remarkably due to the increase in the number of the optical detector and subsequent signal processing circuit. Moreover, the miniaturization of the signal detection and processing system is also the big factor of the technology development. The above-mentioned problem is solved by the following method, in which the conventional coding rule is applied. That is, the neutron detecting element to which a neutron is incident is confirmed by performing the multi-channel simultaneous measurement about the pulse signals from two optical fibers led from the neutron detecting element based on the coding rule, after the optical fibers from three or more neutron detecting elements are led to the optical detector based on the coding rule.

The above-mentioned coding method is, for instance, described in Nucl. Instr. and Meth., A392(1997) 315-318. The fluorescence emitted from the neutron scintillator detection body (pixel) is led to an optical detector through two or more optical fibers and detected. When detecting as a neutron by measuring based on the coincidence of the fluorescence signals output from the optical detector, the optical fiber from each pixel is allotted to the optical detector according to the predetermined combination. The allotment is performed so that the same combination should not exist according to the coding rule. The number of optical detectors is reduced by confirming the incident pixel of the neutron when the signal output from the optical detector is always observed and all signals of one combination are measured simultaneously.

On the other hand, the vacuum-proof which is the most important performance in the present invention is secured as follows. The neutron detecting element is made like the cylinder and two optical fibers which led out from the neutron detecting element are wired by using the cylinder as a conduit. Therefore, optical fibers are not led outside of the neutron detecting element like the same cylinder as $^3$He detector. As a result, it can be facilitated to secure a vacuum by providing the withstand pressure of more than one atmospheric pressure to the material and thickness of the cylinder for neutron detecting element arrangement in which a lot of neutron detecting elements are arranged.

There is a remarkable effect that the inexpensive neutron detector which is not controlled by the situation of the world can be provided stably because the present invention does not require extremely valuable, expensive $^3$He gas. Moreover, because the shape of the main body of the detector is cylindrical and it is quite the same as the positional sensitive $^3$He gas proportional counter, the neutron detector according to the present invention becomes $^3$He substitution neutron detector in the meaning of the truth.

BRIEF DESCRIPTION OF SEVERAL DRAWINGS

Figure 12:
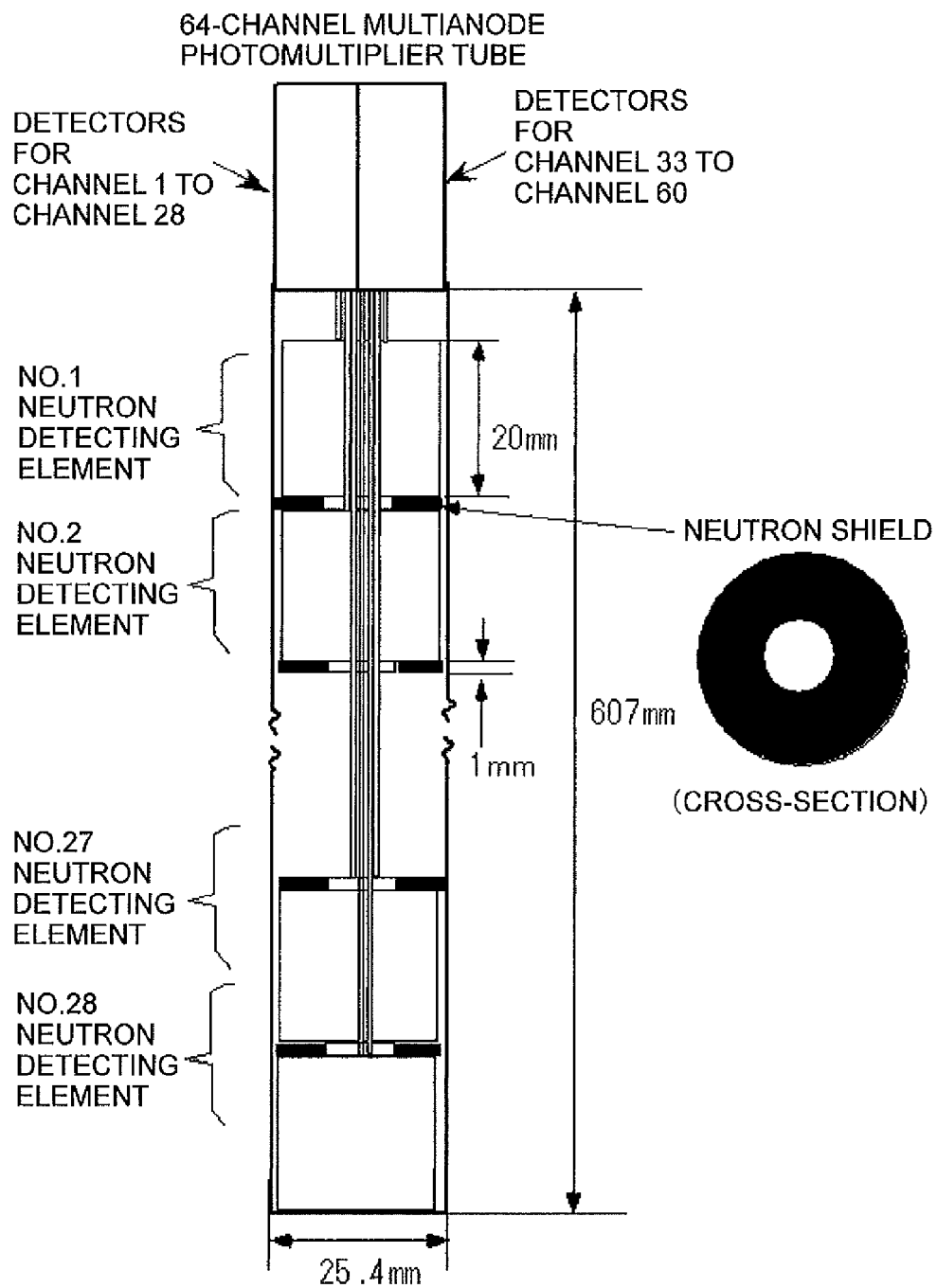

FIG. 12 a schematic view of a neutron detecting element of the neutron detector according to Embodiment 5.

Figure 13:
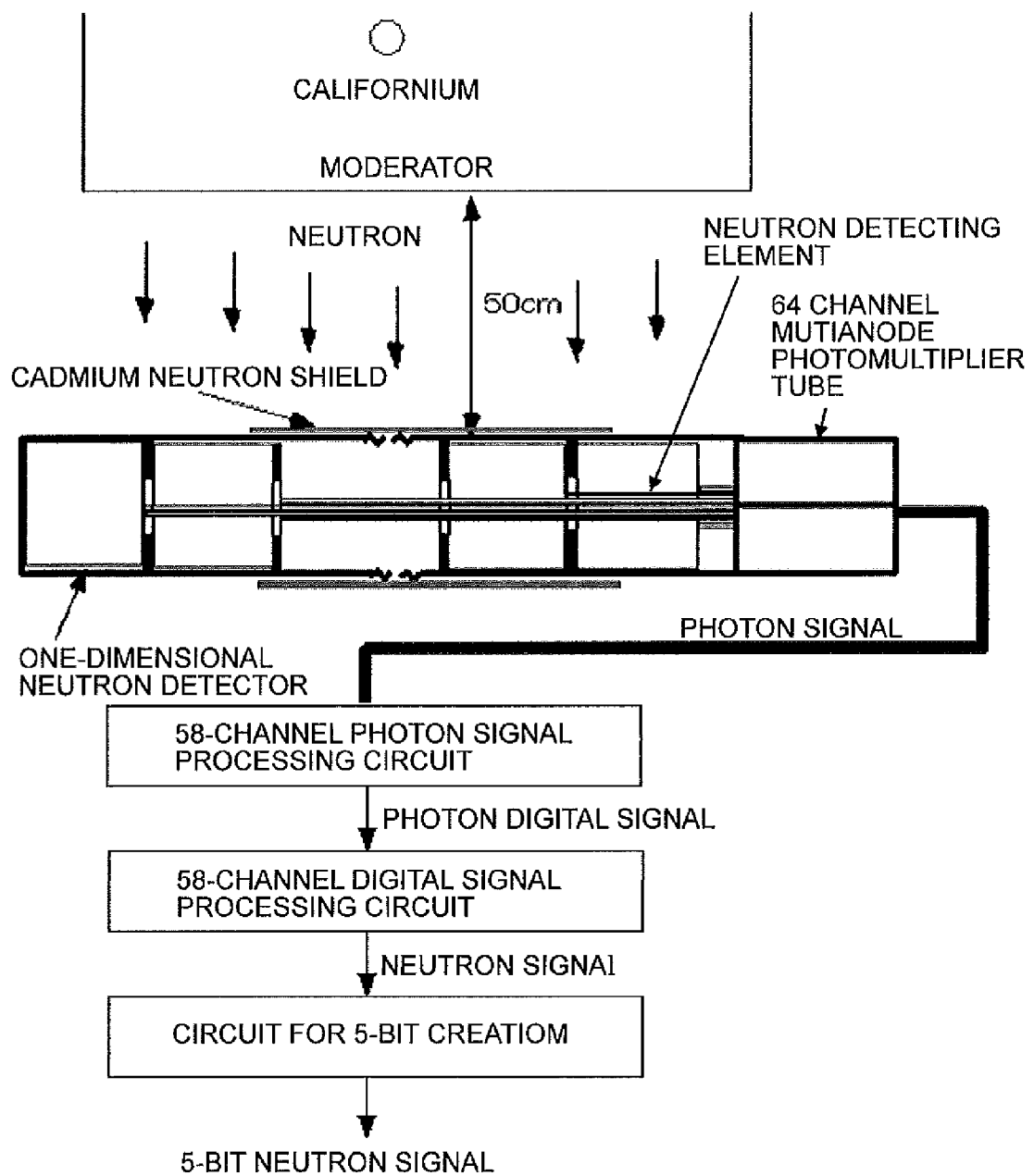

FIG. 13 a block diagram of evaluation test equipment for the neutron detecting element used in the neutron detector according to Embodiment 5.

Figure 14:
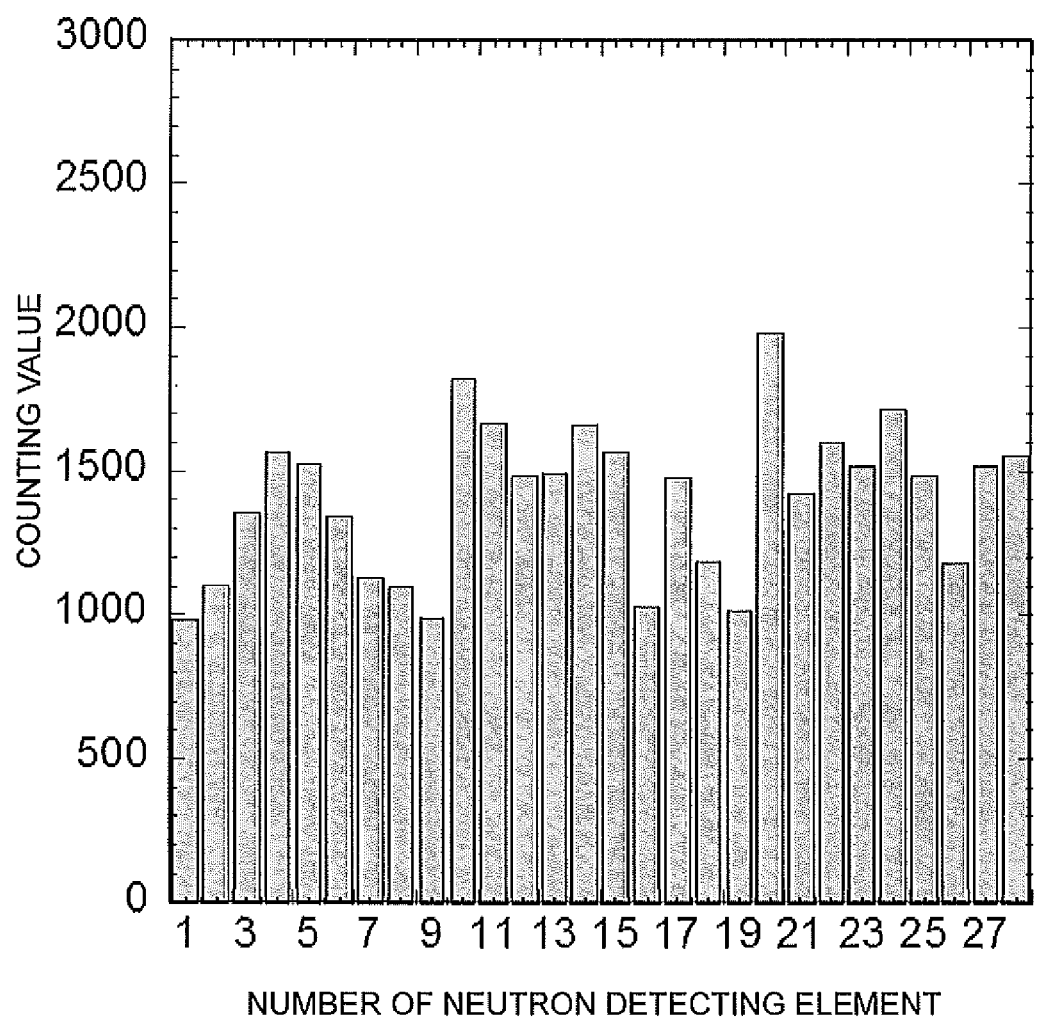

FIG. 14 is a graph illustrating the relationship between neutron detecting element and counting value obtained based on the evaluation test of the neutron detector according to Embodiment 5.

Figure 15:
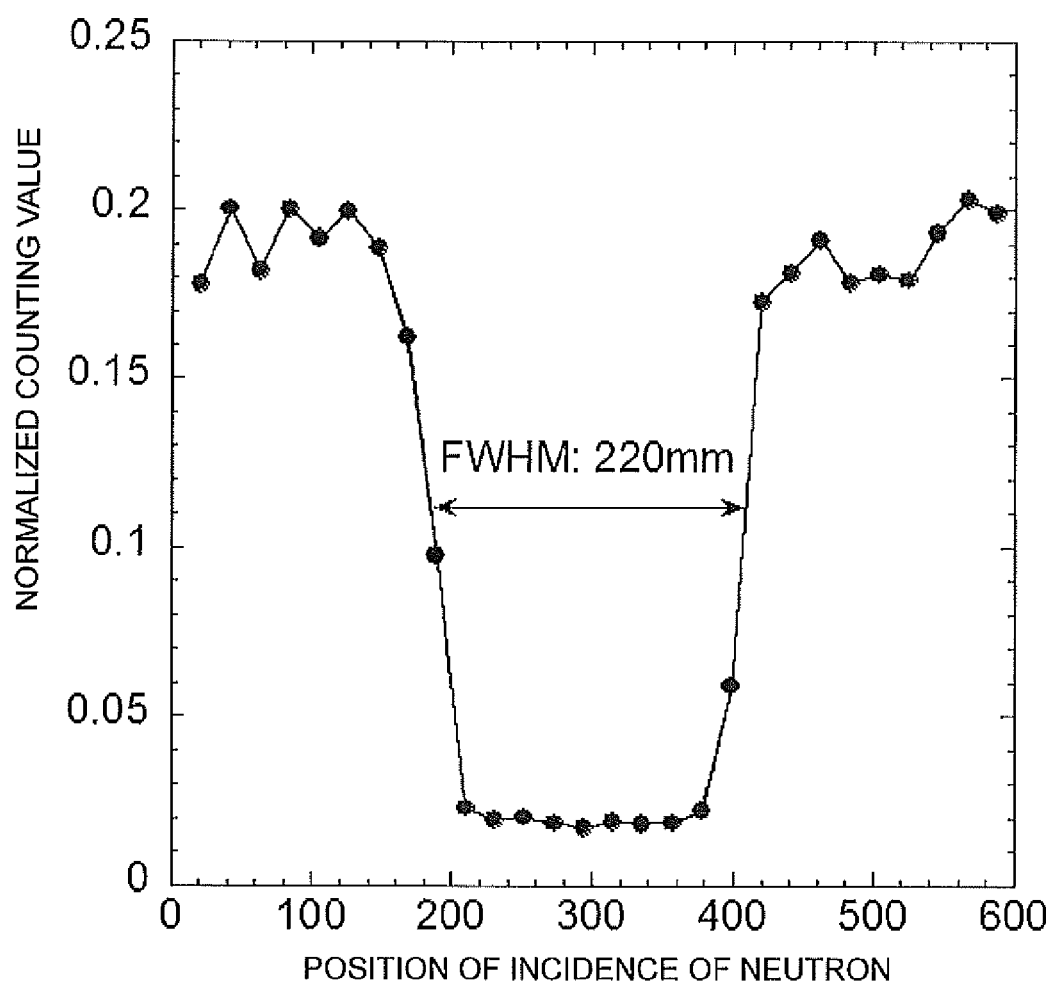

FIG. 15 is a graph illustrating the relationship between the position of incidence of a neutron and a standard counting value in the neutron detector according to Embodiment 5, where the neutron is shielded by using a cadmium board and the position detection characteristic is measured.

FIG. 16 shows Table 1 illustrating a method of processing the signal from the neutron detecting element.

DETAILED DESCRIPTION OF THE INVENTION

[Embodiments]
(Embodiment 1)

Figure 1:
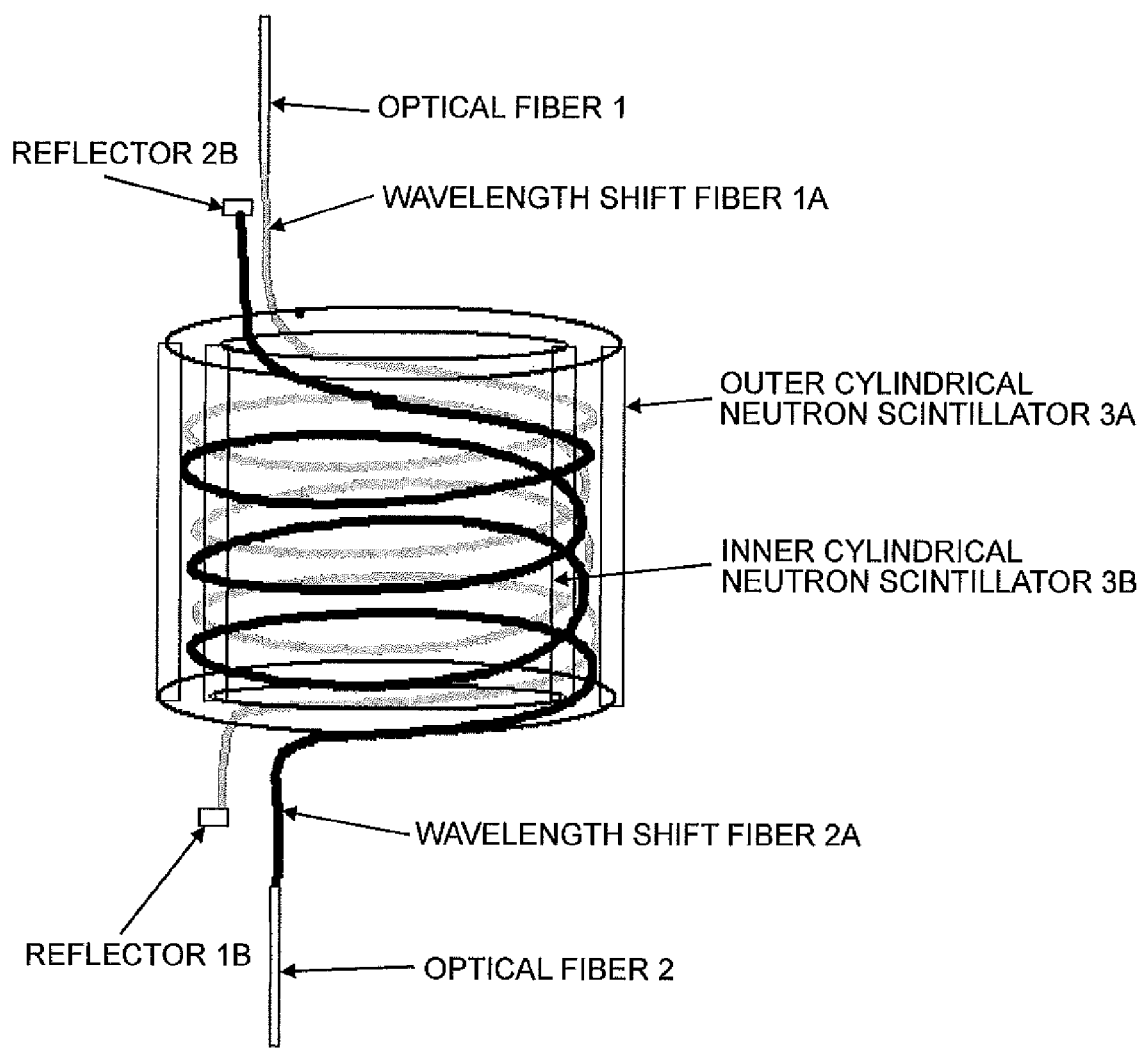
FIG. 1 is a schematic view showing a neutron detecting element composed of an inner cylindrical neutron scintillator, two wavelength shift fibers, and an outer cylindrical neutron scintillator, which is used in the neutron detector according to Embodiment 1.

Embodiment 1 of the present invention will be explained referring to FIG. 1. FIG. 1 shows schematically the structure of the neutron detecting element used in the neutron detector according to Embodiment 1. This neutron detecting element comprises an inner cylindrical neutron scintillator where a neutron detection body which includes a ZnS phosphor and a 6LiF neutron converter material is arranged outside of the cylindrical substrate; a scintillator fluorescence detection body made by placing coiled wavelength shift fibers where two wavelength shift fibers (1a, 2a) are wound in parallel along the cylindrical substrate over an inner cylindrical neutron scintillator, leading both terminals of the two wavelength shift fibers (1a, 2a) inside the cylindrical substrate of inner cylindrical neutron scintillator 3b, and bonding light reflectors (1b, 2b) after optical fibers (1, 2) which lead fluorescence of which the wavelength was shifted in the wavelength shift fiber to an optical detector are connected optically to one end faces and the other end faces of two wavelength shift fibers are made a mirror finished surface; and an outer cylindrical neutron scintillator where a neutron detection body which includes a ZnS phosphor and a $^6$LiF neutron converter material is arranged inside of the cylindrical substrate, the outer cylindrical neutron scintillator being arranged over the scintillator fluorescence detection body.

Each material used to make the neutron detecting element is described in detail first. As the material of a cylindrical substrate, an aluminum board of 0.3 mm in thickness on the market standard A1052 is used. The ZnS/$^6$LiF half transparent type neutron scintillator made of the UK Applied Scintillation Technologies Ltd. is used as a scintillator for neutrons in this Embodiment. In this scintillator, ZnS:Ag phosphor is used as ZnS phosphor, and $^6$LiF is used as the neutron converter. They are secured by adhesive. The mixing ratio of the ZnS:Ag phosphor and $^6$LiF is 2:1, and its thickness is 0.4 mm. The center of the fluorescent wavelength of ZnS:Ag is 450 nm, the fluorescence of wide wavelength in the range of 360 nm to 540 nm is occurred, and fluorescent life time of the short-lived component is about 450 ns.

BCF-92MC made of US Saint-Gobain is used as wavelength shift fibers (1a, 2a), which has sensitivity in fluorescence from 350 nm to 440 nm, and converts the fluorescence of which the center wavelength is 490 nm. The shape of the wavelength shift fiber is circular, and the diameter is 0.75 mm.

As for optical fibers (1, 2) connected optically, which connects optics, plastic optical fiber PGU-FB 750 of 0.75 mm in the diameter, made by Toray Industries, Inc. is used. As a member of the reflecting plate made of aluminum, aluminum sheet MIRO" of 0.3 mm thick, made by Material House Co., Ltd. is used, which has a high reflectance. The total reflection rate of this aluminum sheet is 95% or more and the diffuse reflectance is less than 5%.

In the plastic optical fiber used as an optical fiber in this Embodiment, incident neutrons are scattered due to a lot of hydrogen atoms which exist in the inside of the plastic optical fiber. Therefore, in the case of a large number of fibers are arranged inside of the cylinder of the neutron detecting element, wrong position information is output due to the incidence of the scattered neutron to the next neutron detecting element, and the neutron emitted outside of the neutron detector is detected by the remote neutron detector and forms the background. In the neutron detection system which requires such important detection characteristics, these detection characteristics can be improved by using a glass optical fiber as the optical fiber.

Figure 2:
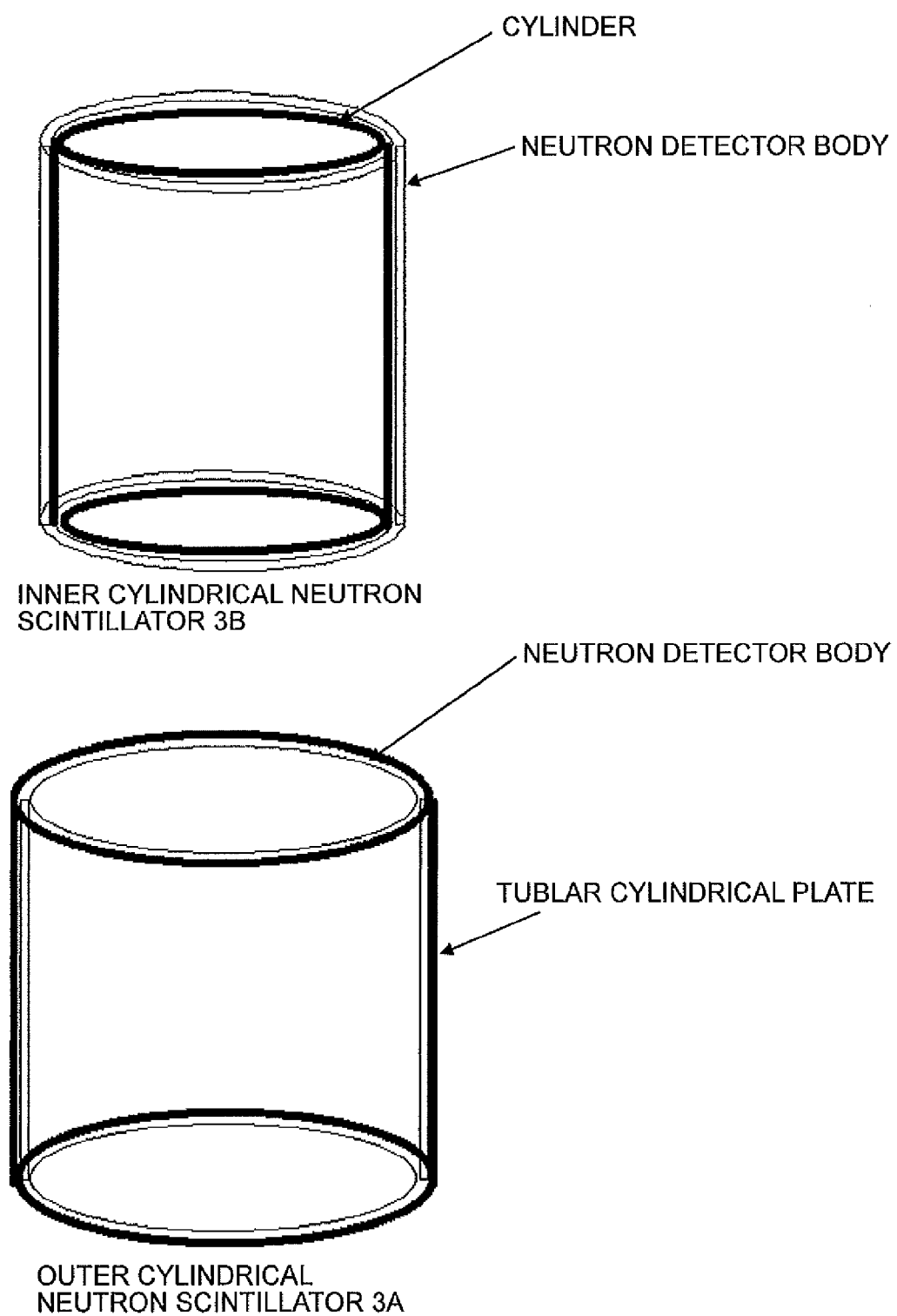
FIG. 2 is a schematic view showing an inner cylindrical neutron scintillator and an outer cylindrical neutron scintillator, which are used in the neutron detector according to Embodiment 1.

The structure of the neutron detecting element according to one embodiment of the present invention will be explained next. The inner cylindrical neutron scintillator is made by bonding ZnS/$^6$LiF half transparent type neutron scintillator made of AST outside of a cylinder of aluminum substrate of 19.1 mm in outside diameter, 18.5 mm in inside diameter, and 0.3 mm in thickness, and 20 mm in length. A schematic view illustrating an inner cylindrical neutron scintillator 3b and an outer cylindrical neutron scintillator 3a is shown in FIG. 2. As for the spacing of 2 wavelength shift fibers, that is, the distance from the center of one shift fiber to the center of the other shift fiber, the trial products of two kinds of spacing of 1.5 mm and 2.25 mm was made to compare with each other. Two wavelength shift fibers were coiled four times in parallel at regular intervals, where they are coiled 6.7 times for the spacing of 1.5 mm, and 4 times for the spacing of 2.25 mm.

Figure 3:
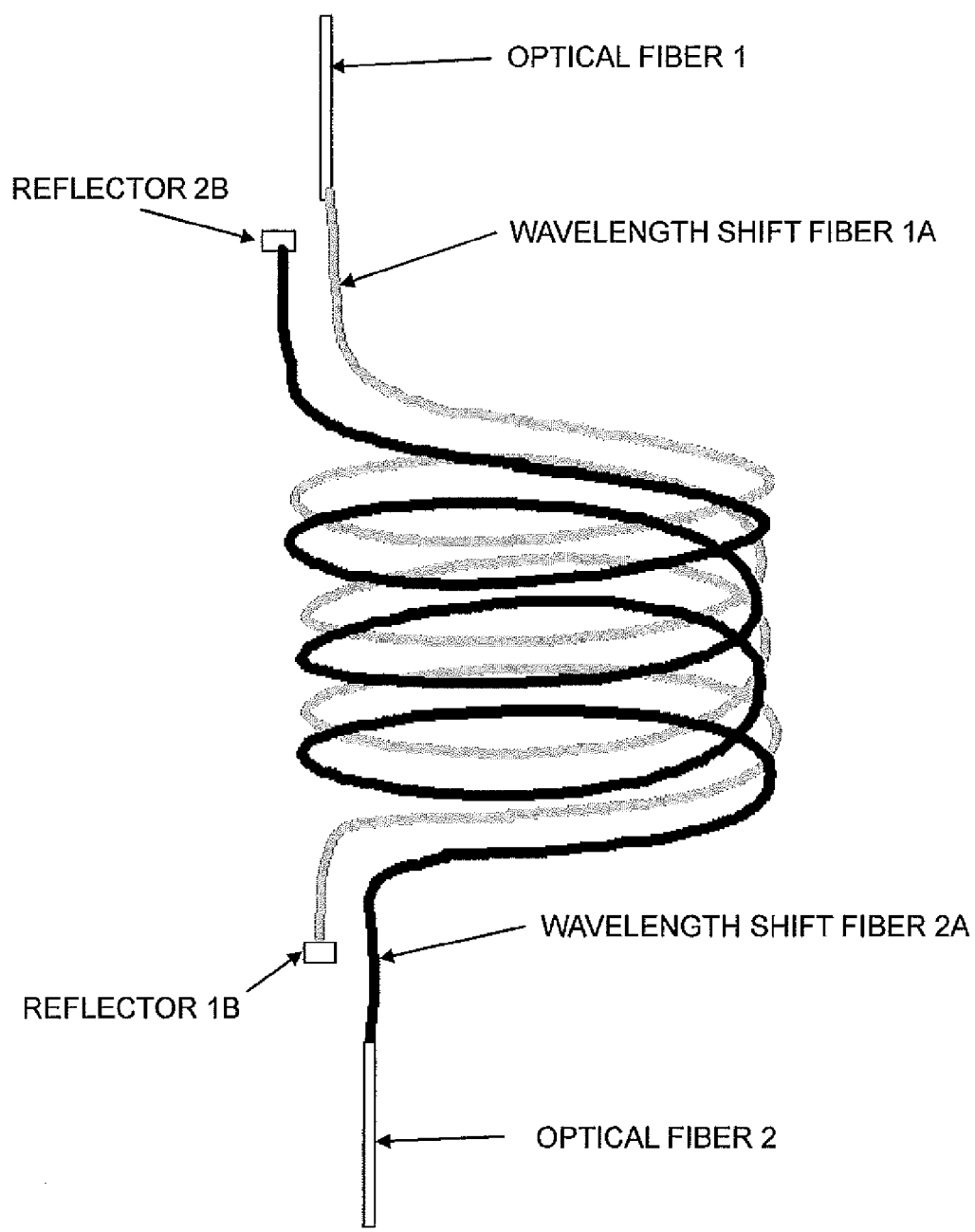
FIG. 3 shows the structure (1) of a scintillator fluorescence detection body used in the neutron detector according to Embodiment 1.

In this Embodiment, one of the connection ends of two wavelength shift fibers (1a, 2a) rolled as in structure (1) of the scintillator fluorescence detection body shown in FIG. 3 and the corresponding optical fibers (1, 2) is the start of winding and the other is the ending. As in structure (2) of the scintillator fluorescence detection body shown in FIG. 4, both connection ends may be the ending.

Both terminals of two wavelength shift fibers which finished being rolled are led inside of the cylinder of inner cylindrical neutron scintillator 3b, and are connected by the optical fiber which leads fluorescence of which the wavelength is shifted by the wavelength shift fiber to the optical detector (not shown). The wavelength shift fibers are put in the middle of the guide tube made of aluminum of 0.8 mm in the inside diameter, 1.2 mm in the outside diameter, and 2 mm in length after the end face of the wavelength shift fiber is polished to the mirror finished surface, and are bonded to the end faces of the optical fibers similarly polished to the mirror finished surface by using the adhesive. The length of optical fibers (1, 2) is assumed more than the length to an optical detector, and the length is decided finally when the optical fibers are connected optically with the optical detector arranged on one side or both sides. After the optical fibers are cut and their end faces are polished, and connected optically with the detection side of the optical detector.

On the other hand, after the other side of wavelength shift fiber (1a, 2a) is led inside the cylindrical substrate, and the end face is polished to the mirror finished surface, the mirror finished surface part of reflecting plate (1b, 2b) made of aluminum cut in 1.2 mm×1.2 mm corner is bonded to it by using the adhesive. A transparent adhesive S·U made by Konishi Co., Ltd. is used as the adhesive. The scintillator fluorescence detection body is completed by this manufacturing process.

The outer cylindrical neutron scintillator 3a in which ZnS/$^6$LiF semitransparent scintillator is bonded inside of aluminum cylinder of 23 mm in outside diameter, 22.4 mm in inside diameter, 0.3 mm in thickness, and 20 mm in length is arranged on this scintillator fluorescence detection body. As for the size of the neutron detecting element finally completed, the inside diameter is 18.5 mm, the outside diameter is 23 mm including the working accuracy etc., and the length is 20 mm.

Figure 5:
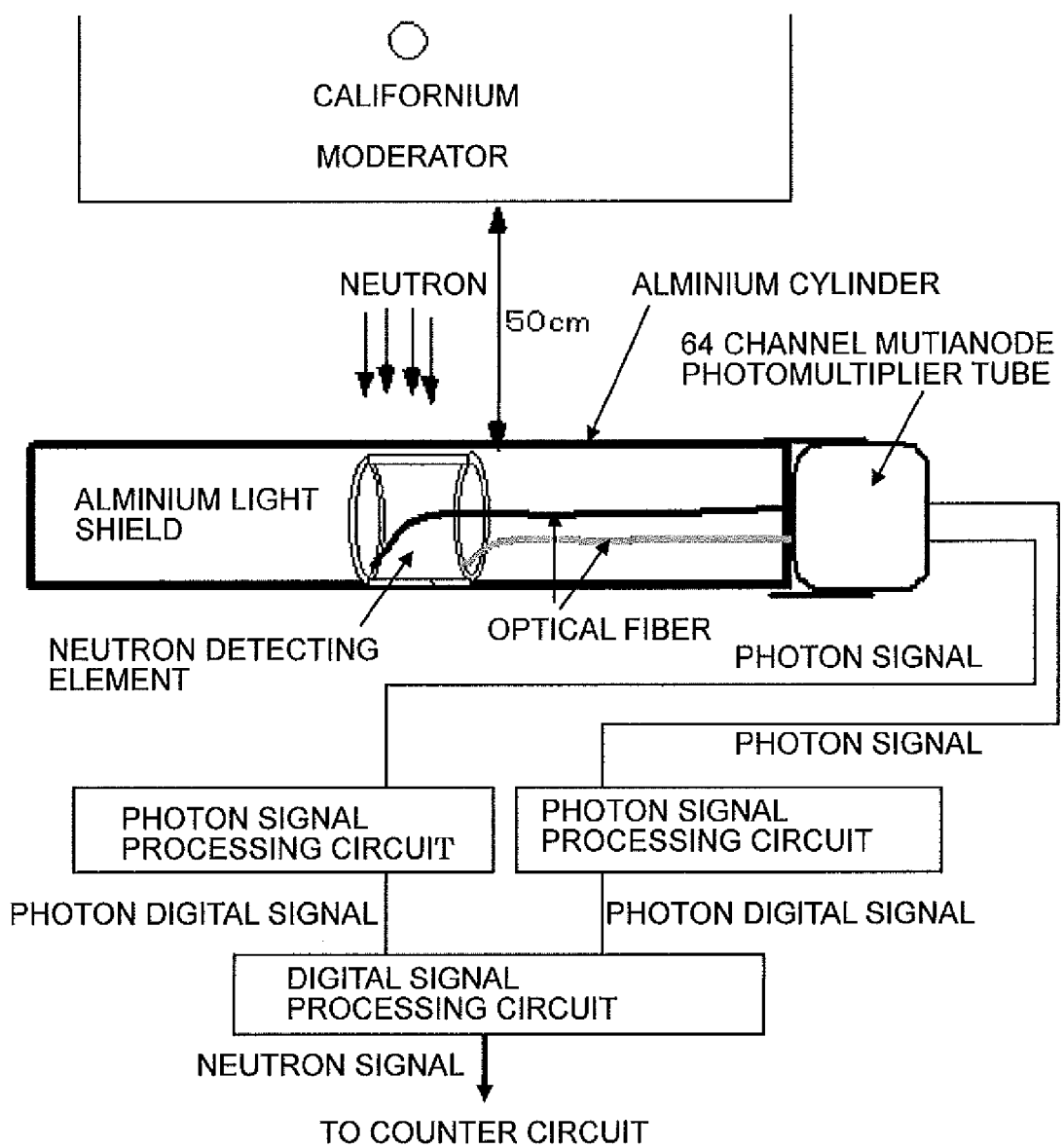
FIG. 5 is a block diagram of evaluation test equipment for the neutron detecting element used in the neutron detector according to Embodiment 1.

The evaluation test by which incident neutrons are detected is carried out about two kinds of neutron detecting elements made for trial purposes, in which two optical fibers which led out of the neutron detecting element made according to the Embodiment is connected optically with the optical detector, and two fluorescence signals detected by the optical detector is measured simultaneously. FIG. 5 shows the configuration of an apparatus for carrying out the evaluation test.

This neutron detecting element is arranged in the middle of aluminum cylinder of 23.4 mm in inside diameter, 25.4 mm in outside diameter, 1 mm in thickness, and 100 mm in length. The one side of the cylinder is shaded with the aluminum board, and the optical detector is installed in the other side and shaded. 64 channel multi-anode photomultiplier tube H7546 made by Hamamatsu Photonics K.K. which is available to the photon counting is used as the optical detector. The sensitive size of one channel of H7546 is of 2 mm×2 mm. In the evaluation test, only two channels of detectors of 64 channels is used.

Because the fluorescence output from the wavelength shift fiber is very little, each fluorescence signal output from two photomultiplier tube tubes was processed by using the photon measurement method in this Embodiment.

Figure 6:
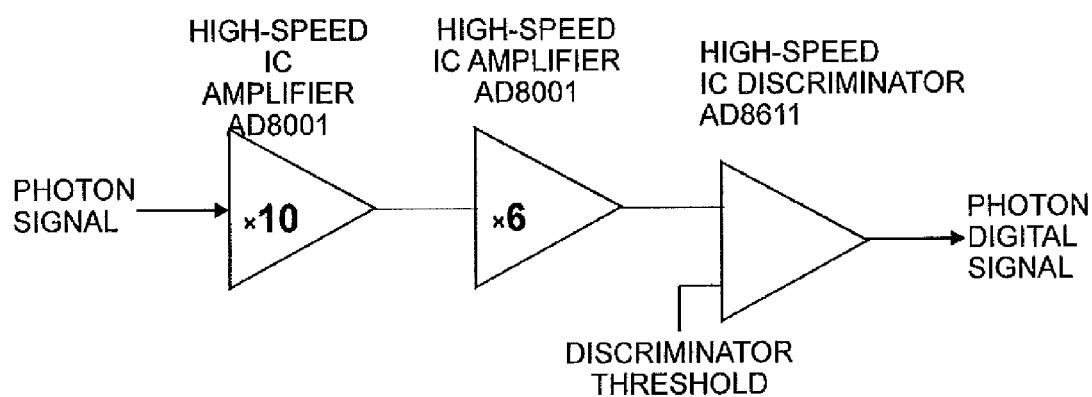
FIG. 6 is a block diagram of a photon signal processing circuit used in the neutron detector according to Embodiment 1.

Each photon signal output from the photomultiplier tube is amplified by a photon signal amplifier composed of a high-speed IC amplifier, and then converted into a photon digital pulse signal by a photon signal discrimination circuit composed of a high-speed IC discriminator. The block diagram of this photon signal processing circuit is shown in FIG. 6.

The photon signal amplifier comprises an amplifier with the performance of 60 times the gain in band width 200 MHz, composed by using two AD8001 high-speed IC amplifiers made by Analog Devices Inc. for each circuit. The photon signal discrimination circuit was composed by using AD8611 made by Analog Devices Inc. as high-speed IC discriminator. It is possible to make a photon digital pulse signal having a pulse time width of about 5 ns as a signal of one photon by using the electronic circuit composed like this.

Next, the photon digital pulse signal generated by the photon output from each photomultiplier tube is taken out from a synchronization signalizing circuit comprised of gate circuits as a synchronization photon signal synchronized with a clock pulse by using the clock pulse of the width which equals to the pulse time width of the photon digital pulse signal. The frequency of the clock pulse is assumed to be 100 MHz which generates the same pulse time width as 5 ns pulse time width of the photon digital pulse signal.

The count is started based on a start time signal which is a photon digital pulse signal input first to a photon digital counter circuit, and carried out during the counting time which corresponds to the coincidence time in the general coincidence circuit. Photon integral value which corresponds to two optical fibers is obtained by using two circuits mentioned above. When an integral value more than the photon discrimination value set beforehand is obtained from both circuits during the counting time, a neutron signal is output. In this Embodiment, a photon discrimination value set corresponding to each photomultiplier tube is five photons.

Figure 7:
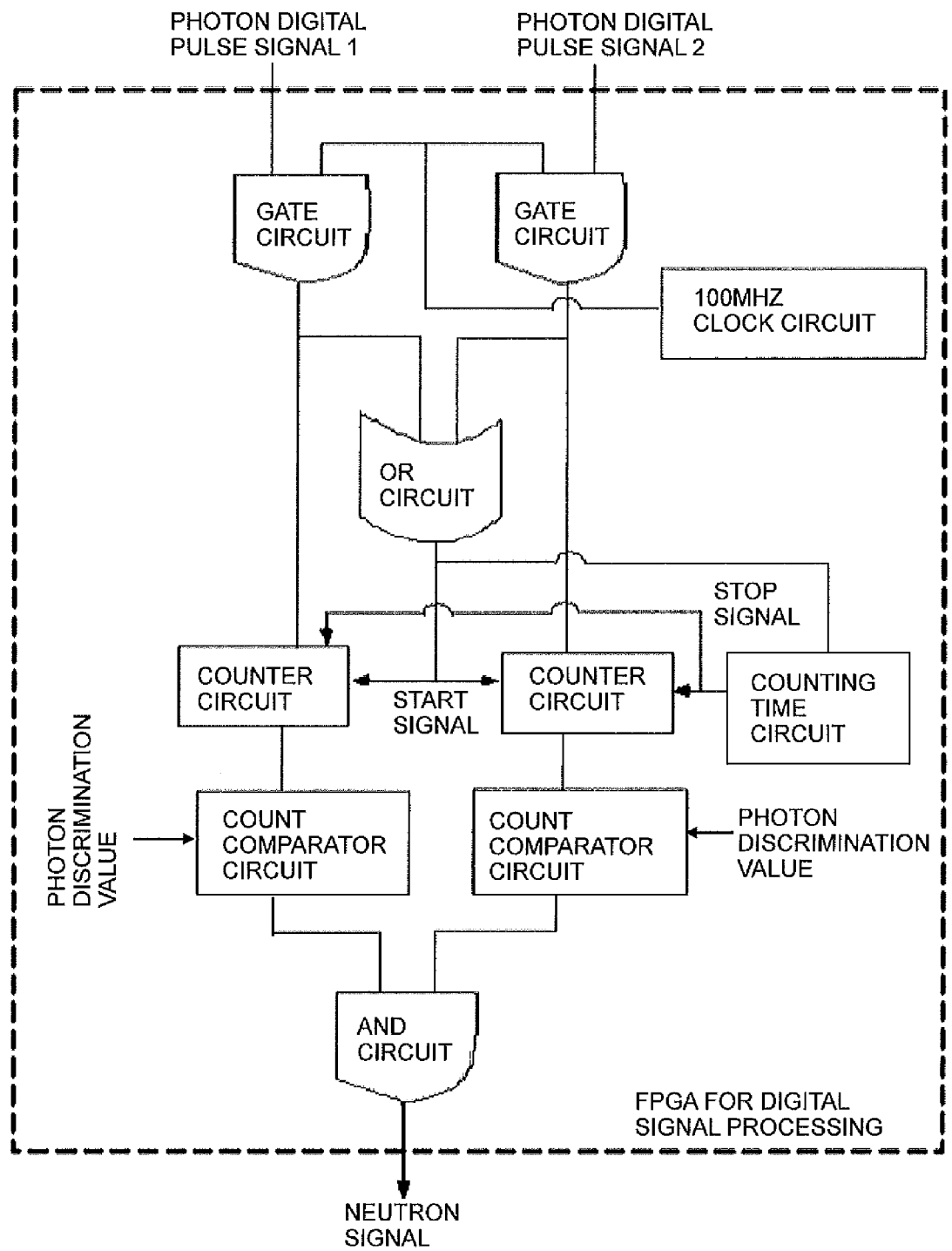
FIG. 7 is a block diagram of a digital signal processing circuit used in the neutron detector according to Embodiment 1.

It is possible to use FPGA (Free Programmable Gate Array) as these digital signal processing circuits. The configuration of the digital signal processing circuit is shown in FIG. 7.

In this Embodiment, the counting time is set to the width of time of 5 µs in order to use fluorescence emitted from the ZnS:Ag phosphor at incidence of neutron effectively.

The neutron detection efficiency of this neutron detecting element was measured by using the californium radiation source as a neutron source. The neutron detector was positioned from the moderator system of the californium radiation source to 50 cm remote place so that the neutron beam might almost become parallel. Strength of the neutron beam at the measurement place is calibrated by using the $^3$He gas neutron detector of which the detection efficiency is known, and it is confirmed that it is 31.2 n/s·cm2. As a result, in the case where the wavelength shift fiber is rolled 6.7 times at intervals of 1.5 mm, the detection efficiency of 69% was obtained for the thermal neutron, and in the case where the wavelength shift fibers was rolled four times at intervals of 2.25 mm, the detection efficiency of 80% was obtained.

Next, the evaluation test of the gamma ray sensitivity which becomes a big problem as a background in the neutron detector with a scintillator is performed. Because the ZnS/$^6$LiF half transparent type neutron scintillator is used as a scintillator in this Embodiment, an amount of fluorescence caused by the gamma rays detected by the scintillator is a little. And, because the thickness of the scintillator is 0.4 mm, very thin, the gamma ray sensitivity due to the scintillator is very low. A major cause of the gamma detection due to this neutron detecting element exists in that the wavelength shift fiber originally has the same composition as a plastic fiber for the gamma detection. When gamma rays are incident to the wavelength shift fiber and absorbed therein, and primary electrons are emitted, the primary electrons generate a lot of fluorescence in the wavelength shift fiber.

However, it is possible to decrease greatly the gamma ray sensitivity by measuring the coincidence of signals from two wavelength shift fibers as described above. The reason is that the possibility of the gamma detection due to the simultaneous measurement occurs when the primary electrons generated in one wavelength shift fiber by gamma rays and emitted from the wavelength shift fiber are incident to the other wavelength shift fiber. Therefore, the possibility of the gamma detection can be greatly decreased if two wavelength shift fibers are spaced. On the other hand, the fluorescence produced in the scintillator due to neutrons is diffused and incident to two wavelength shift fibers. Therefore, it can be identified as a neutron signal by simultaneous measurement.

The coincidence time in the coincidence is set to the width of time of 5 µs in order to use fluorescence emitted from the ZnS:Ag phosphor at incidence of neutron effectively.

The gamma ray sensitivity of the neutron detecting element was evaluated by using $^{60}$Co radiation source as a gamma source. The gamma ray sensitivity was obtained by assuming the distance between $^{60}$Co radiation source and the neutron detector to be 5 cm, measuring gamma rays for 600 seconds, and dividing the detection counting by the number of incidence of gamma rays to detectors. As a result, in the case where the wavelength shift fiber is rolled 6.7 times at intervals of 1.5 mm, the gamma ray sensitivity of $3 \times 10^{-7}$ was obtained, and in the case where the wavelength shift fibers was rolled four times at intervals of 2.25 mm, the gamma ray sensitivity of $6 \times 10^{-7}$ was obtained. It was able to be confirmed that the neutron detector according to the present invention shows sufficiently low gamma ray sensitivity from this measurement result though this measurement was performed under the measurement condition that measuring time is short and the statistical error is large.

(Embodiment 2)

Figure 8:
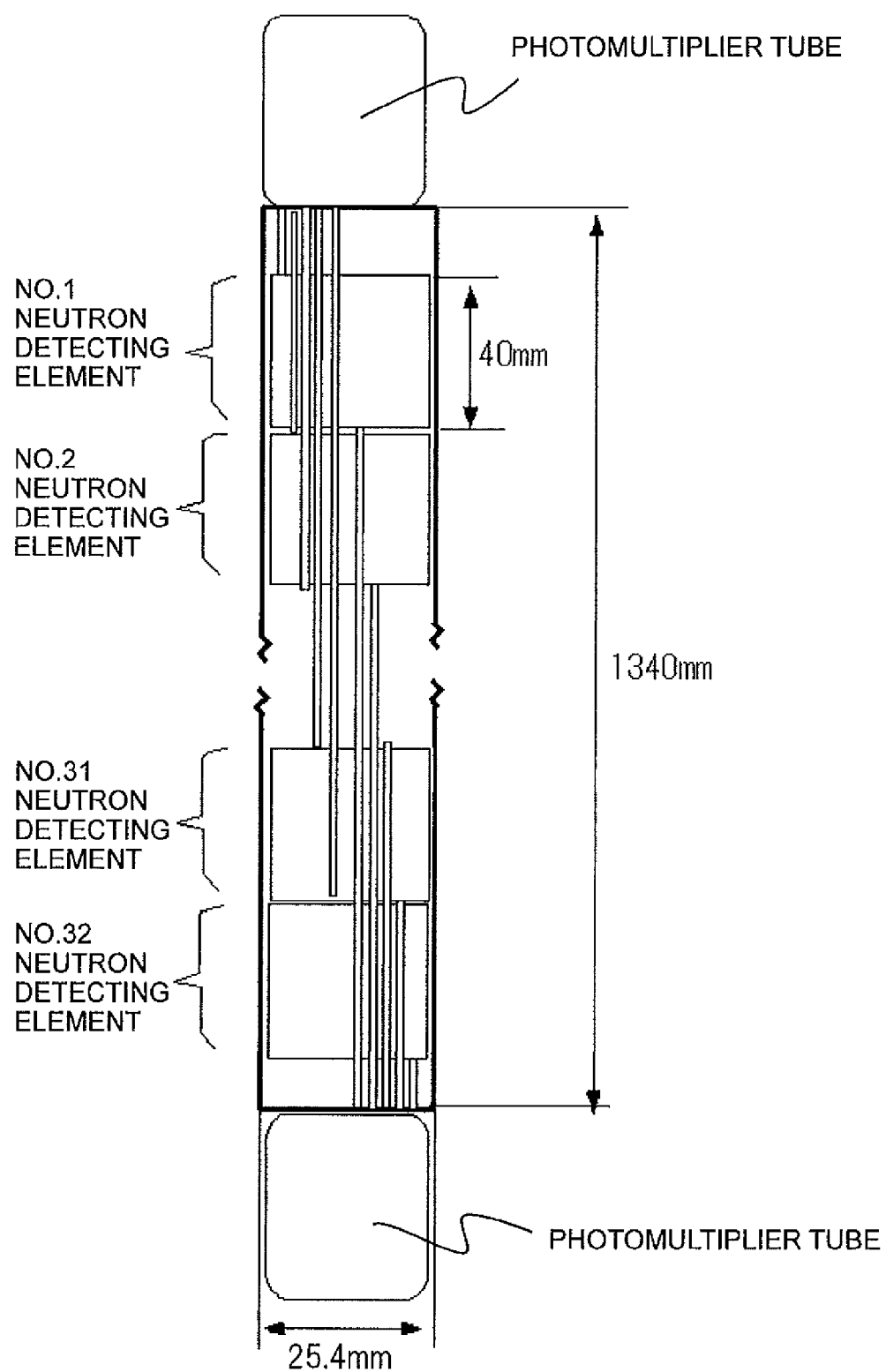
FIG. 8 is a schematic view of a neutron detecting element of the neutron detector according to Embodiment 2.

Next, the neutron detector of other types is explained referring to FIG. 8. 32 neutron detecting elements are closely arranged in the cylinder for neutron detecting element arrangement. The space in the cylinder of the neutron detecting element is used as a conduit for optical fibers. Two optical fibers are led to two optical detectors, respectively, arranged on both sides of the cylinder for neutron detecting element arrangement. After the optical fibers which led out from each neutron detecting element is settled as a pair to form two set of optical fiber bunches, each fluorescence is detected by two optical detectors. The fluorescence signals converted into pulse signals by two optical detectors are led to a coincidence circuit. When two fluorescence signals are measured simultaneously during the predetermined period of time, a neutron signal is output.

When the high position resolution is not required, longer element is advantageous in the cost. Therefore, the length of the neutron detecting element used in this Embodiment is assumed to be 40 mm twice the length of the neutron detecting element in Embodiment 1. The materials used in this Embodiment is the same as Embodiment 1.

The inner cylindrical neutron scintillator is made by bonding ZnS/$^6$LiF half transparent type neutron scintillator made of AST outside of a cylinder of aluminum substrate of 19.5 mm in outside diameter, 18.5 mm in inside diameter, and 0.3 mm in thickness, and 40 mm in length. Because larger spacing of 2 wavelength shift fibers is advantageous from the reason mentioned hereafter, two wavelength shift fibers were coiled 8 times in parallel at regular intervals, where the intervals is the distance from the center of one shift fiber to the center of the other shift fiber. In this Embodiment, one of the connection ends of two wavelength shift fibers rolled and the corresponding optical fibers is the start of winding and the other is the end of winding as shown in FIG. 3. The length of one wavelength shift fiber is about 500 mm.

Both terminals of two wavelength shift fibers which finished being rolled are led inside of the cylinder of inner cylindrical neutron scintillator, and are connected with the optical fiber which leads fluorescence of which the wavelength is shifted by the wavelength shift fiber to the optical detector (not shown). The wavelength shift fibers are put in the middle of the guide tube made of aluminum of 0.8 mm in the inside diameter, 1.2 mm in the outside diameter, and 2 mm in length after the end face of the wavelength shift fiber is polished to the mirror finished surface, and are bonded to the end faces of the optical fibers similarly polished to the mirror finished surface by using the adhesive. The length of optical fibers is assumed more than the length to an optical detector, and the length is decided finally when the optical fibers are connected optically with the optical detector arranged on one side or both sides. After the optical fibers are cut and their end faces are polished, and connected optically with the detection side of the optical detector.

On the other hand, after the other side of wavelength shift fibers led inside the cylindrical substrate, and the end face is polished to the mirror finished surface, the mirror finished surface part of reflecting plate made of aluminum cut in 1.2 mm×1.2 mm corner is bonded to it by using the adhesive. A transparent adhesive S·U made by Konishi Co., Ltd. is used as the adhesive. The scintillator fluorescence detection body is completed by this manufacturing process.

The outer cylindrical neutron scintillator in which ZnS/$^6$LiF semitransparent scintillator is bonded inside of aluminum cylinder of 23 mm in outside diameter, 22.4 mm in inside diameter, 0.3 mm in thickness, and 40 mm in length is arranged on this scintillator fluorescence detection body.

As for the size of the neutron detecting element finally completed, the inside diameter is 18.5 mm, the outside diameter is 23 mm including the working accuracy etc., and the length is 40 mm. The wavelength shift fiber used becomes 500 mm or more by the straight line though it is possible to adjust the length of the neutron detecting element to 40 mm or more on the structure. As a result, the fluorescence of which the wavelength is shifted in the wavelength shift fiber is self-absorbed. Eventually, less than 60% only reaches the end face. Namely, the detection efficiency to the neutron decreases as a whole and the sensitivity of the wavelength shift fiber changes greatly at the detection position. Therefore, it becomes difficult to keep the neutron detection efficiency constant, and thus to secure the performance as the neutron detector.

32 neutron detecting elements are arranged in the cylinder for neutron detecting element arrangement in this Embodiment. The size of the cylinder for neutron detecting element arrangement is assumed to be 23.4 mm in the inside diameter, 25.4 mm in the outside diameter, and 1 mm in thickness. The margins of 30 mm on both sides to have to bundle the optical fibers are provided, although the length of detecting elements is 40 mm×32=1280 mm. Accordingly, the total length is 1,340 mm. The cylinder is made of aluminum of market standard A5052.

In this Embodiment, two optical fibers led out from the neutron detecting element are collected on both sides of the cylinder for neutron detecting element arrangement and then the detection processing is carried out. When two optical fibers which led out from the neutron detecting element are collected on both sides as two sets of optical fiber bunches, a round optical fiber bunch of about 6 mm in the diameter is formed because one set is composed of 32 optical fibers.

On the other hand, R1924A of 25 mm in the outside diameter made by Hamamatsu Photonics K.K, which is available in the photon counting is used as the photomultiplier tube. The sensitive diameter is 22 mm and it is enough to detect the optical fiber bunch of about 6 mm in the diameter. Because the gain of 2×10$^6$ at the applied voltage 1000V is obtained, the photon counting can be carried out enough. These photomultiplier tubes are set on both sides of the cylinder for neutron detecting element arrangement, and then the light shielding is provided.

Because the fluorescence output from the wavelength shift fiber is very little, each fluorescence signal output from two photomultiplier tube tubes was processed by using the photon measurement method in this Embodiment.

Each photon signal output from a photomultiplier tube is amplified by a photon signal amplifier composed of a high-speed IC amplifier, and then it is converted into a photon digital pulse signal by a photon signal discrimination circuit composed of the discriminator circuit. The photon signal amplifier comprises an amplifier with the performance of 60 times the gain in band width 200 MHz, composed by using two AD8001 high-speed IC amplifiers made by Analog Devices Inc. for each circuit. The photon signal discrimination circuit was composed by using AD8611 made by Analog Devices Inc. as high-speed discriminator IC. It is possible to make a photon digital pulse signal having a pulse time width of about 5 ns as a signal of one photon by using the electronic circuit composed like this.

Next, the photon digital pulse signal generated by the photon output from each photomultiplier tube is taken out from a synchronization signalizing circuit comprised of gate circuits as a synchronization photon signal synchronized with a clock pulse by using the clock pulse of the width which equals to the pulse time width of the photon digital pulse signal. The frequency of the clock pulse is assumed to be 100 MHz which generates the same pulse time width as 5 ns pulse time width of the photon digital pulse signal.

The count is started based on a start time signal which is a photon digital pulse signal input first to a photon digital counter circuit, and carried out during the counting time which corresponds to the coincidence time in the general coincidence circuit. Photon integral value which corresponds to two optical fibers is obtained by using two circuits mentioned above. When an integral value more than the predetermined photon discrimination value is obtained from both circuits during the counting time, a neutron signal is output. In this Embodiment, a photon discrimination value set corresponding to each photomultiplier tube is five photons.

In this Embodiment, the counting time is set to the width of time of 5 μs in order to use fluorescence emitted from the ZnS:Ag phosphor at incidence of neutron effectively.

The large area neutron detector having a neutron sensitive area of 22 mm in width and 128 mm in length can be composed according to the above-mentioned manufacturing process.

(Embodiment 3)

The neutron detector which performs one-dimensional detection of neutrons is explained based on Embodiment 3. 28 neutron detecting elements according to Embodiment 1 are arranged in close proximity to each other in the cylinder for neutron detecting element arrangement. Where, each neutron detecting element serve as a one-dimensional position detection body. The space in the cylinder of the neutron detecting element is used as a conduit for optical fibers. Two optical fibers are led to a multichannel optical detector, arranged on one side of the cylinder for neutron detecting element arrangement. Each fluorescence is detected by two optical detectors, using the optical fibers which led out from each neutron detecting element as a pair. The fluorescence signals converted into pulse signals by two optical detectors are led to a coincidence circuit. When two fluorescence signals are measured simultaneously during the predetermined period of time, a neutron signal is output.

Figure 9:
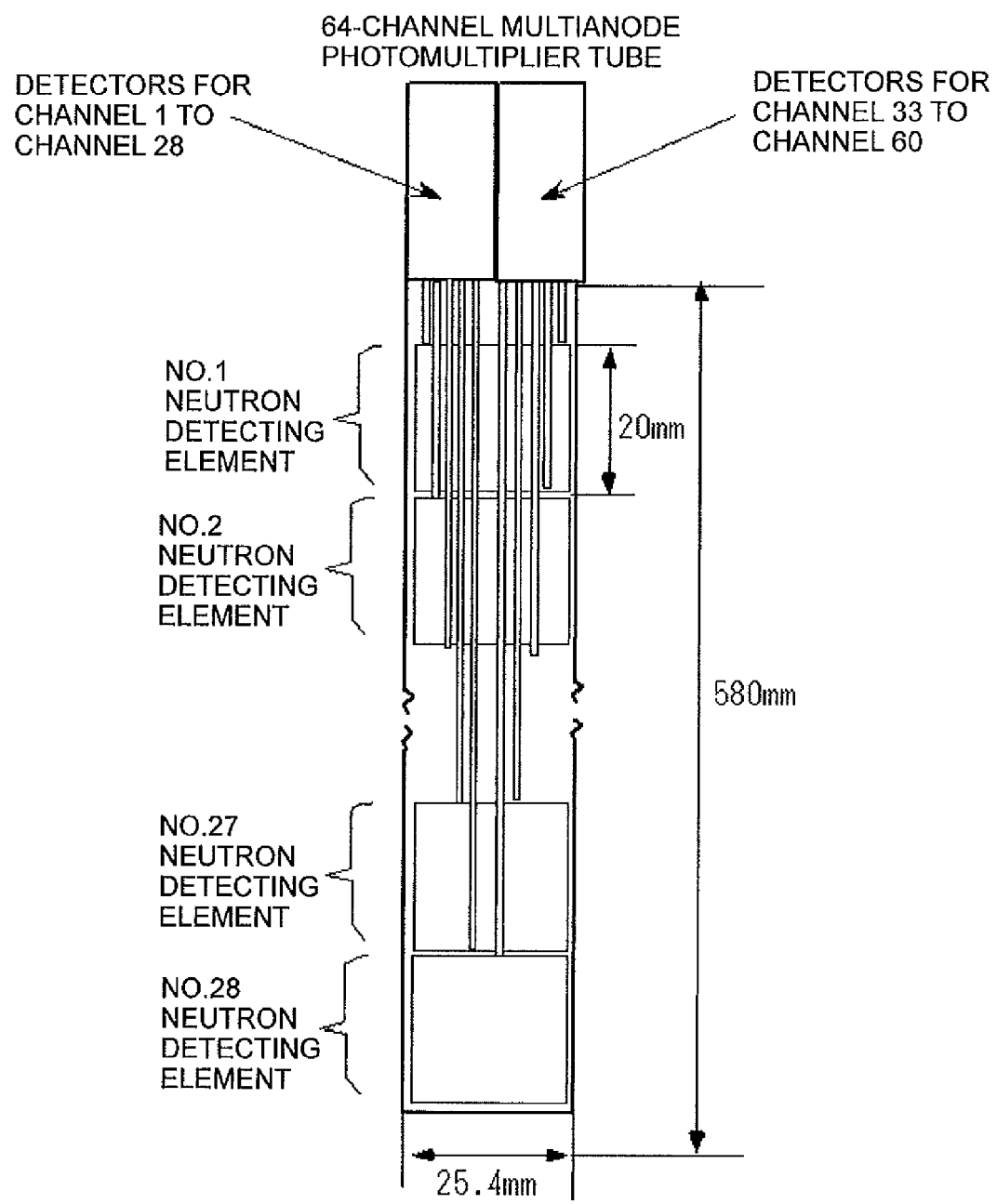
FIG. 9 is a schematic view of a neutron detecting element of the neutron detector according to Embodiment 3.

The structure of the neutron detecting element in this Embodiment is described referring to FIG. 9. The material and the structure used are the same as Embodiment 1. The inner cylindrical neutron scintillator is made by bonding ZnS/$^6$LiF half transparent type neutron scintillator made of AST outside of a cylinder of aluminum substrate of 19.5 mm in outside diameter, 18.5 mm in inside diameter, and 0.3 mm in thickness, and 20 mm in length. Because larger spacing of 2 wavelength shift fibers is advantageous from the reason mentioned hereafter, two wavelength shift fibers were coiled 6.7 times in parallel at intervals of 1.5 mm, where the intervals is the distance from the center of one shift fiber to the center of the other shift fiber.

Figure 4:
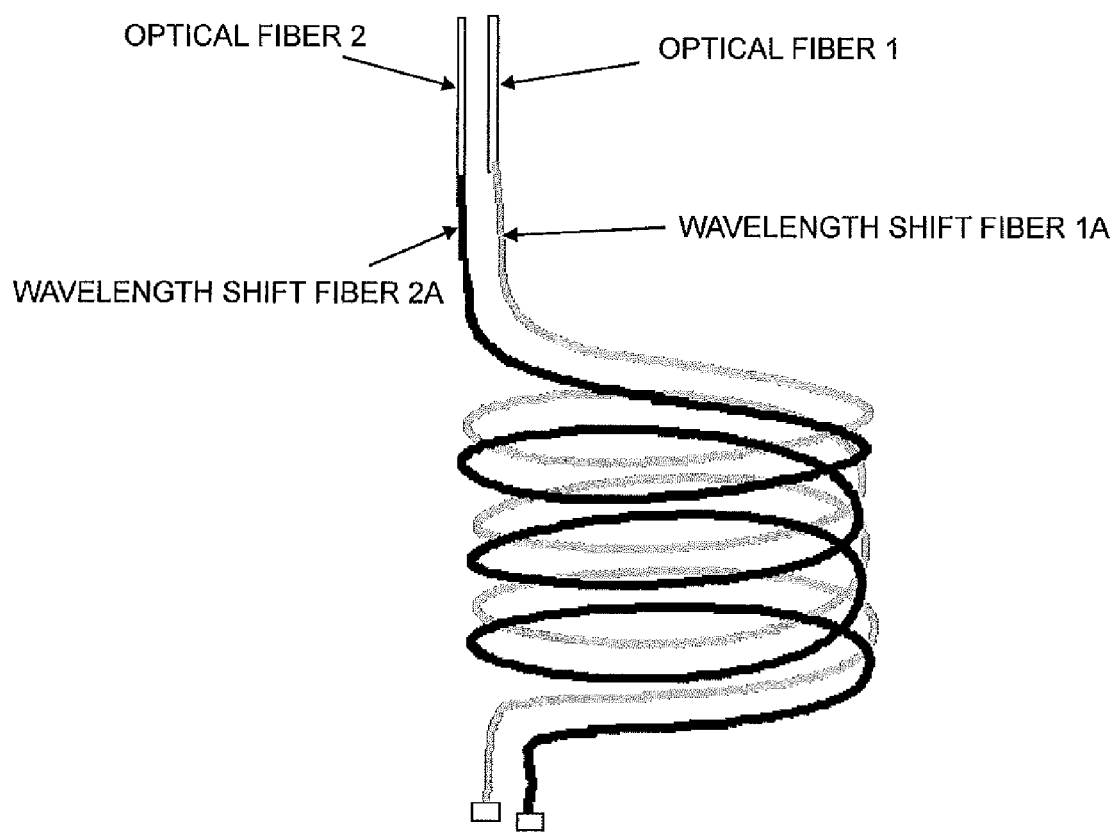
FIG. 4 shows the structure (2) of a scintillator fluorescence detection body used in the neutron detector according to Embodiment 1.

In this Embodiment, both connection ends of two wavelength shift fibers rolled and the corresponding optical fibers are the end of winding as shown in FIG. 4. Both terminals of two wavelength shift fibers which finished being rolled are led inside of the cylinder of inner cylindrical neutron scintillator, and are connected with the optical fiber which leads fluorescence of which the wavelength is shifted by the wavelength shift fiber to the optical detector (not shown). The wavelength shift fibers are put in the middle of the guide tube made of aluminum of 0.8 mm in the inside diameter, 1.2 mm in the outside diameter, and 2 mm in length after the end face of the wavelength shift fiber is polished to the mirror finished surface, and are bonded to the end faces of the optical fibers similarly polished to the mirror finished surface by using the adhesive. The length of optical fibers is assumed more than the length to an optical detector, and the length is decided finally when the optical fibers are connected optically with the optical detector arranged on one side or both sides. After the optical fibers are cut and their end faces are polished, and connected optically with the detection side of the optical detector.

On the other hand, after the other side of wavelength shift fibers led inside the cylindrical substrate, and the end face is polished to the mirror finished surface, the mirror finished surface part of reflecting plate made of aluminum cut in 1.2 mm×1.2 mm corner is bonded to it by using the adhesive. A transparent adhesive S·U made by Konishi Co., Ltd. is used as the adhesive. The scintillator fluorescence detection body is completed by this manufacturing process.

The outer cylindrical neutron scintillator in which ZnS/$^6$LiF semitransparent scintillator is bonded inside of aluminum cylinder of 23 mm in outside diameter, 22.4 mm in inside diameter, 0.3 mm in thickness, and 20 mm in length is arranged on this scintillator fluorescence detection body. As for the size of the neutron detecting element finally completed, the inside diameter is 18.5 mm, the outside diameter is 23 mm including the working accuracy etc., and the length is 20 mm.

28 neutron detecting elements is arranged in the cylinder for neutron detecting element arrangement in this Embodiment. The size of the cylinder for neutron detecting element arrangement is assumed to be 23.4 mm in the inside diameter, 25.4 mm in the outside diameter, and 1 mm in thickness. The margins of 20 mm on the side of the optical detector are provided though the length of detecting elements is 20 mm×28=560 mm. Accordingly, the total length is 580 mm. The cylinder is made of aluminum of market standard A5052.

In this Embodiment, two optical fibers led out from the neutron detecting element are collected on one side of the cylinder for neutron detecting element arrangement and then the detection processing is carried out. Therefore, the light shielding is provided on one side of the cylinder by using an aluminum board. The space in the cylinder of the neutron detecting element is used as a conduit for optical fibers. Each of two optical fibers is led to the multichannel optical detector, arranged in one side of the cylinder for neutron detecting element arrangement.

Multi anode photomultiplier tube 7546 made by Hamamatsu Photonics K.K, in which the sensitive area of one channel is 2 mm×2 mm and which is available in the photon counting is used as the multichannel optical detector. Because the gain of $2\times10^6$ at the applied voltage 950V is obtained, the photon counting can be carried out enough.

Because the fluorescence output from the wavelength shift fiber is very little, each fluorescence signal output from the multichannel photomultiplier tube was processed by using the photon measurement method in this Embodiment.

Each photon signal output from the photomultiplier tube is amplified by a photon signal amplifier composed of a high-speed amplifier, and then converted into a photon digital pulse signal by a photon signal discrimination circuit composed of a high-speed IC discriminator.

The photon signal amplifier comprises an amplifier with the performance of 60 times the gain in band width 200 MHz, composed by using two AD8001 high-speed IC amplifiers made by Analog Devices Inc. for each circuit. The photon signal discrimination circuit was composed by using AD8611 made by Analog Devices Inc. as high-speed IC discriminator. It is possible to make a photon digital pulse signal having a pulse time width of about 5 ns as a signal of one photon by using the electronic circuit composed like this.

Next, the photon digital pulse signal generated by the photon output from each photomultiplier tube is taken out from a synchronization signalizing circuit comprised of gate circuits as a synchronization photon signal synchronized with a clock pulse by using the clock pulse of the width which equals to the pulse time width of the photon digital pulse signal. The frequency of the clock pulse is assumed to be 100 MHz which generates the same pulse time width as 5 ns pulse time width of the photon digital pulse signal.

The count is started based on a start time signal which is a photon digital pulse signal input first to a photon digital counter circuit, and carried out during the counting time which corresponds to the coincidence time in the general coincidence circuit. The photon integral value which corresponds to two optical fibers is obtained by using two circuits mentioned above. When an integral value more than the photon discrimination value set beforehand is obtained from both circuits during the counting time, a neutron signal is output. In this Embodiment, a photon discrimination value set corresponding to each photomultiplier tube is five photons.

In this Embodiment, the counting time is set to the width of time of 5 μs in order to use fluorescence emitted from the ZnS:Ag phosphor at incidence of neutron effectively.

Neutron one-dimensional image data is acquired by reducing the final signal output number by pairing two optical fibers led out from each neutron detecting element and performing the above-mentioned signal processing, and causing the output neutron incidence signal to be five bit data as position information in order of the arrangement of the neutron detecting elements, and then sending them to the neutron image processing apparatus.

(Embodiment 4)

Figure 10:
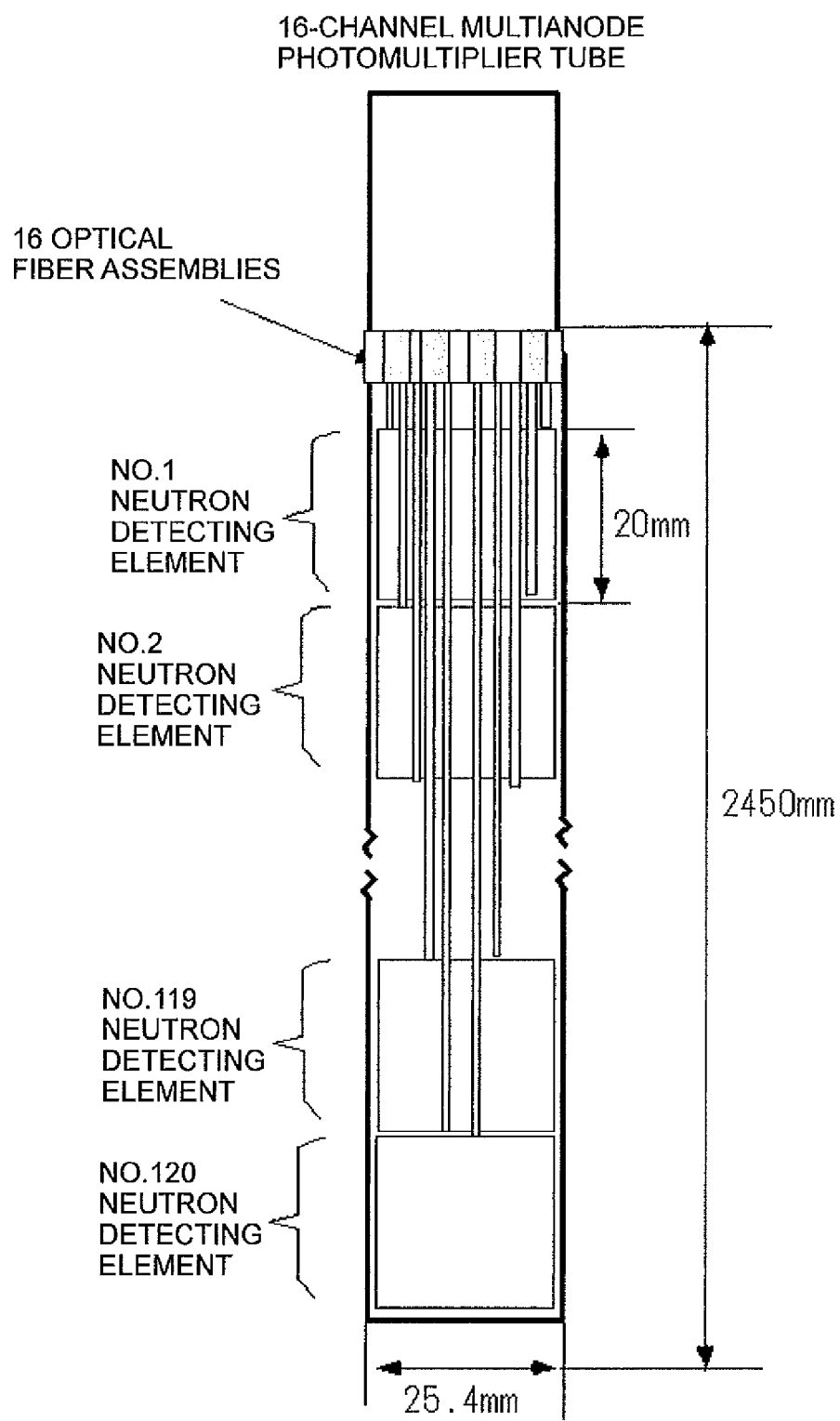
FIG. 10 is a schematic view of a neutron detecting element in the neutron detector according to Embodiment 4.

The neutron detector which performs one-dimensional detection of neutrons is explained based on Embodiment 4. 120 neutron detecting elements according to Embodiment 1 is arranged in close proximity to each other in the cylinder for neutron detecting element arrangement. Where, each neutron detecting element serves as a one-dimensional position detection body. The space in the cylinder for the neutron detecting element arrangement is used as a conduit for optical fibers. Two optical fibers led out from the neutron detecting element are led to a multichannel optical detector, arranged on one side of the cylinder for neutron detecting element arrangement. Two optical fibers from the neutron detecting element are connected optically with each optical detector of 16 channel optical detector based on the predetermined coding rule. The fluorescence emitted when the neutron is incident to the neutron scintillator and is captured therein is detected by two wavelength shift fibers, and the fluorescence of which the wavelength is shifted is detected by the multi-channel optical detector based on the coding rule. The fluorescence signal converted into the pulse signal by each optical detector is led to the multichannel coincidence circuit. Two optical detectors which two signals were measured simultaneously during the predetermined period of time are specified, and the position of incidence of neutron to 120 neutron detecting elements arranged in the cylinder for neutron detecting element arrangement is decided based on the coding rule. The structure of the neutron detecting element in this Embodiment is described referring to FIG. 10. The material and the structure used are the same as Embodiment 1.

The inner cylindrical neutron scintillator is made by bonding ZnS/$^6$LiF half transparent type neutron scintillator made of AST outside of a cylinder of aluminum substrate of 19.5 mm in outside diameter, 18.5 mm in inside diameter, and 0.3 mm in thickness, and 20 mm in length. Two wavelength shift fibers were coiled 6.7 times in parallel at intervals of 1.5 mm, where the intervals is the distance from the center of one shift fiber to the center of the other shift fiber.

In this Embodiment, both connection ends of two wavelength shift fibers rolled and the corresponding optical fibers are the end of winding as shown in FIG. 4. Both terminals of two wavelength shift fibers which finished being rolled are led inside of the cylinder of inner cylindrical neutron scintillator, and are connected with the optical fiber which leads fluorescence of which the wavelength is shifted by the wavelength shift fiber to the optical detector (not shown). The wavelength shift fibers are put in the middle of the guide tube made of aluminum of 0.8 mm in the inside diameter, 1.2 mm in the outside diameter, and 2 mm in length after the end face of the wavelength shift fiber is polished to the mirror finished surface, and are bonded to the end faces of the optical fibers similarly polished to the mirror finished surface by using the adhesive. The length of optical fibers is assumed more than the length to an optical detector, and the length is decided finally when the optical fibers are connected optically with the optical detector arranged on one side or both sides. After the optical fibers are cut and their end faces are polished, and connected optically with the detection side of the optical detector.

On the other hand, after the other side of wavelength shift fibers led inside the cylindrical substrate, and the end face is polished to the mirror finished surface, the mirror finished surface part of reflecting plate made of aluminum cut in 1.2 mm×1.2 mm corner is bonded to it by using the adhesive. A transparent adhesive S·U made by Konishi Co., Ltd. is used as the adhesive. The scintillator fluorescence detection body is completed by this manufacturing process.

The outer cylindrical neutron scintillator in which ZnS/$^6$LiF semitransparent scintillator is bonded inside of aluminum cylinder of 23 mm in outside diameter, 22.4 mm in inside diameter, 0.3 mm in thickness, and 20 mm in length is arranged on this scintillator fluorescence detection body. As for the size of the neutron detecting element finally completed, the inside diameter is 18.5 mm, the outside diameter is 23 mm including the working accuracy etc., and the length is 20 mm.

120 neutron detecting elements is arranged in the cylinder for neutron detecting element arrangement in this Embodiment. The size of the cylinder for neutron detecting element arrangement is assumed to be 23.4 mm in the inside diameter, 25.4 mm in the outside diameter, and 1 mm in thickness. The margins of 50 mm on the side of the optical detector are provided though the length of detecting elements is 20 mm×120=2,400 mm. Accordingly, the total length is 2,450 mm. The cylinder is made of aluminum of market standard A5052.

In this Embodiment, two optical fibers led out from the neutron detecting element are collected on one side of the cylinder for neutron detecting element arrangement and then the detection processing is carried out. Therefore, the light shielding is provided on one side of the cylinder by using an aluminum board. The space in the cylinder of the neutron detecting element is used as a conduit for optical fibers. Each of two optical fibers is led to the multichannel optical detector, arranged in one side of the cylinder for neutron detecting element arrangement.

$^2$Cn coding in Table 1 shown in FIG. 16 is performed to two optical fibers led out from each neutron detecting element, and then is connected with the multichannel optical detector. C of $^2$Cn is mathematical symbol by which the combination is shown. The number of combinations in $^2$Cn can be calculated by the expression of n×(n−1)/2. The number n necessary to achieve 120 kinds shown in Table 1 becomes 16. In a word, the number of channels of photomultiplier tube necessary for $^2$Cn coding for 120 neutron detecting elements becomes 16 channels. Moreover, the number of optical fibers connected optically with each photomultiplier tube is 15. Therefore, when the optical fibers of 0.75 mm in diameter is bundled in the quadrangle, the physical dimension becomes about 3 mm×3 mm.

Multi anode photomultiplier tube H8711 of 16 channels, made by Hamamatsu Photonics K.K, in which the sensitive area of one channel is 4.2 mm×4.2 mm and which is available in the photon counting is used as the multichannel optical detector. The sensitive size is one which can be detected enough because the optical fiber bunch bundled is 3 mm×3 mm. Moreover, because the gain of $10^7$ can be obtained at the applied voltage 900V, the photon counting can be carried out enough.

Because the fluorescence output from the wavelength shift fiber is very little, each fluorescence signal output from the multichannel photomultiplier tube was processed by using the photon measurement method in this Embodiment.

Each photon signal output from the photomultiplier tube is amplified by a photon signal amplifier composed of a high-speed amplifier, and then converted into a photon digital pulse signal by a photon signal discrimination circuit composed of a high-speed IC discriminator.

The photon signal amplifier comprises an amplifier with the performance of 60 times the gain in band width 200 MHz, composed by using two AD8001 high-speed IC amplifiers made by Analog Devices Inc. for each circuit. The photon signal discrimination circuit was composed by using AD8611 made by Analog Devices Inc. as high-speed IC discriminator. It is possible to make a photon digital pulse signal having a pulse time width of about 5 ns as a signal of one photon by using the electronic circuit composed like this.

Next, the photon digital pulse signal generated by the photon output from each photomultiplier tube is taken out from a synchronization signalizing circuit comprised of gate circuits as a synchronization photon signal synchronized with a clock pulse by using the clock pulse of the width which equals to the pulse time width of the photon digital pulse signal. The frequency of the clock pulse is assumed to be 100 MHz which generates the same pulse time width as 5 ns pulse time width of the photon digital pulse signal.

Figure 11:
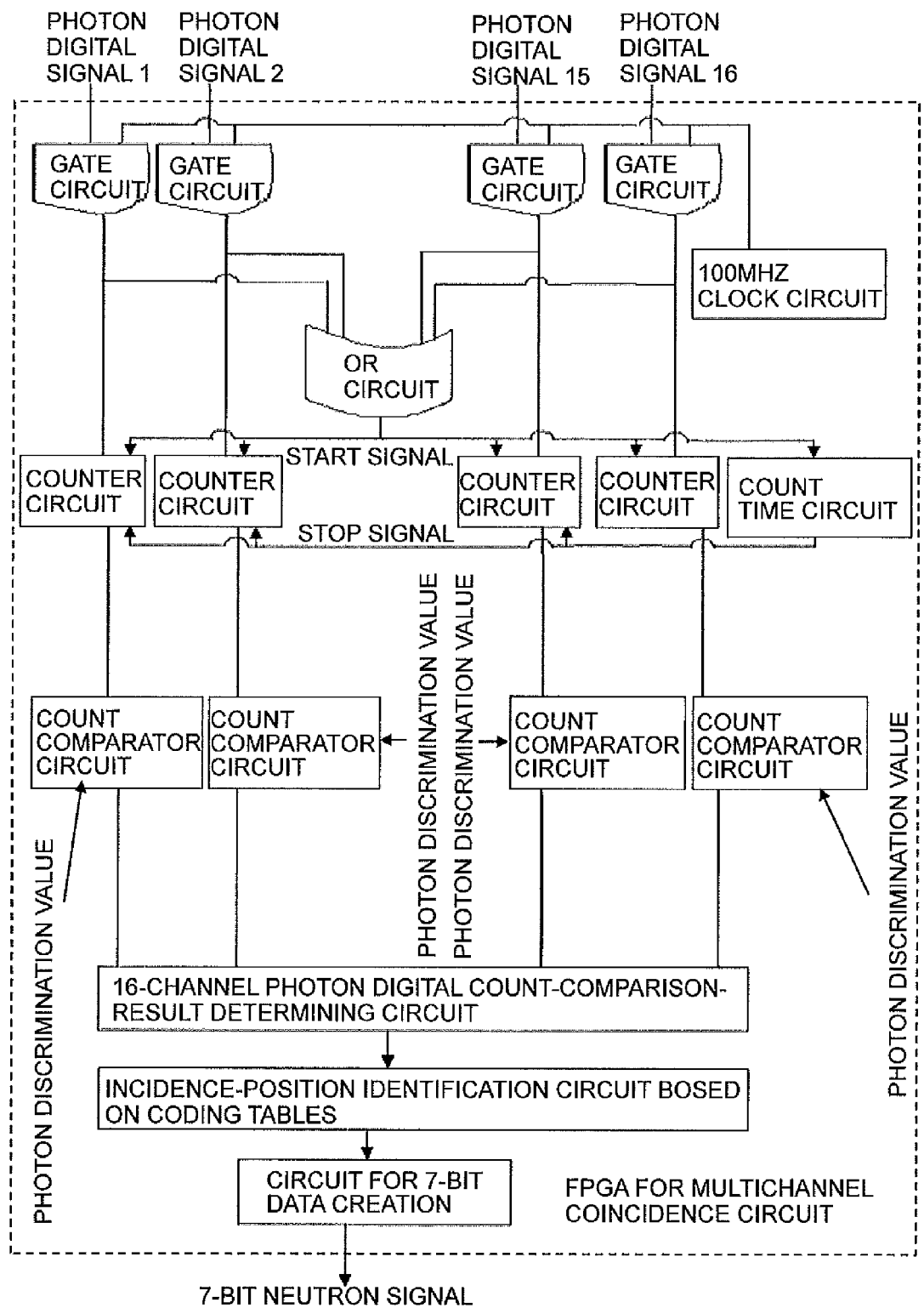
FIG. 11 is a block diagram of a multi-channel coincidence circuit used in Embodiment 4.

The photon digital pulse signal output from multi anode photomultiplier tube of 16 channels is counted by 16 photon digital counter circuits in a multichannel coincidence circuit composed of the FPGA element as shown in FIG. 11. The count is started based on a start time signal which is a photon digital pulse signal input first from any one of channels, and is carried out during the counting time which corresponds to the coincidence time in the general coincidence circuit. Two photon digital counter circuits which indicate the integral value more than the predetermined photon discrimination value are specified after the counting of each photon digital counter circuit ends, and the positions of incidence of neutrons in 120 channels are decided according to the coding rule. Neutron one-dimensional image data is acquired by causing the position information of 120 channels to be seven bit data, reducing a final signal power output number, and then sending them to the neutron image processing apparatus. In this Embodiment, a photon discrimination value set corresponding to each photomultiplier tube is five photons.

In this Embodiment, the counting time is set to the width of time of 5 μs in order to use fluorescence emitted from the ZnS:Ag phosphor at incidence of neutron effectively.

(Embodiment 5)

Next, the neutron detector according to Embodiment 5 is explained referring to FIG. 12. 28 neutron detecting elements according to Embodiment 1 is arranged in close proximity to each other in the cylinder for neutron detecting element arrangement. In this case, the round-shaped neutron shield with the same outside diameter as the neutron detecting element is arranged between adjacent neutron detecting elements. As for the neutron shield, the hole is made in the space in the substrate of the cylinder of the neutron detecting element so that the wiring for the optical fiber is possible. Two optical fibers are led to a multichannel optical detector, arranged on one side of the cylinder for neutron detecting element arrangement. Each fluorescence is detected by two optical detectors, using the optical fibers which led out from each neutron detecting element as a pair. The fluorescence signals converted into pulse signals by two optical detectors are led to a coincidence circuit. When two fluorescence signals are measured simultaneously during the predetermined period of time, a neutron signal is output. The neutron leakage detection between adjacent neutron detecting elements is prevented, and the position resolution of the one-dimensional detection is improved according to this Embodiment.

The material and the structure used are the same as Embodiment 1. The inner cylindrical neutron scintillator is made by bonding ZnS/$^6$LiF half transparent type neutron scintillator made of AST outside of a cylinder of aluminum substrate of 19.5 mm in outside diameter, 18.5 mm in inside diameter, and 0.3 mm in thickness, and 20 mm in length. Two wavelength shift fibers were coiled 6.7 times in parallel at intervals of 1.5 mm, where the intervals is the distance from the center of one shift fiber to the center of the other shift fiber.

In this Embodiment, both connection ends of two wavelength shift fibers rolled and the corresponding optical fibers are the end of winding as shown in FIG. 4. Both terminals of two wavelength shift fibers which finished being rolled are led inside of the cylinder of inner cylindrical neutron scintillator, and are connected with the optical fiber which leads fluorescence of which the wavelength is shifted by the wavelength shift fiber to the optical detector (not shown). The wavelength shift fibers are put in the middle of the guide tube made of aluminum of 0.8 mm in the inside diameter, 1.2 mm in the outside diameter, and 2 mm in length after the end face of the wavelength shift fiber is polished to the mirror finished surface, and are bonded to the end faces of the optical fibers similarly polished to the mirror finished surface by using the adhesive. The length of optical fibers is assumed more than the length to an optical detector, and the length is decided finally when the optical fibers are connected optically with the optical detector arranged on one side or both sides. After the optical fibers are cut and their end faces are polished, and connected optically with the detection side of the optical detector.

On the other hand, after the other side of wavelength shift fibers led inside the cylindrical substrate, and the end face is polished to the mirror finished surface, the mirror finished surface part of reflecting plate made of aluminum cut in 1.2 mm×1.2 mm corner is bonded to it by using the adhesive. A transparent adhesive S·U made by Konishi Co., Ltd. is used as the adhesive. The scintillator fluorescence detection body is completed by this manufacturing process.

The outer cylindrical neutron scintillator in which ZnS/$^6$LiF semitransparent scintillator is bonded inside of aluminum cylinder of 23 mm in outside diameter, 22.4 mm in inside diameter, 0.3 mm in thickness, and 20 mm in length is arranged on this scintillator fluorescence detection body. As for the size of the neutron detecting element finally completed, the inside diameter is 18.5 mm, the outside diameter is 23 mm including the working accuracy etc., and the length is 20 mm.

28 neutron detecting elements is arranged in the cylinder for neutron detecting element arrangement in this Embodiment. The size of the cylinder for neutron detecting element arrangement is assumed to be 23.4 mm in the inside diameter, 25.4 mm in the outside diameter, and 1 mm in thickness. The margins of 20 mm on the side of the optical detector are provided though the length of detecting elements is (20+1) mm×27+20=587 mm in consideration of the shield of 1 mm in thickness as described later. Accordingly, the total length is 607 mm. The cylinder is made of aluminum of market standard A5052.

The round-shaped neutron shield is arranged between the adjacent neutron detecting elements when the neutron detecting element is placed inside of the cylinder in this Embodiment. Thereby, the leakage detection of the neutron between adjacent neutron detecting elements is prevented to improve the position resolution at the one-dimensional detection. $B_4C$ powder is used as the material of the neutron shield. And, the shield is made by solidifying the $B_4C$ powder by using an epoxy resin. The mixing ratio of $B_4C$ powder and the epoxy resin are adjusted to the weight ratio of 6:4. The physical dimensions of the shield is 23 mm in diameter and 1 mm in thickness, and a perforated hole of 6 mm in diameter is punctured into the round-shaped neutron shield as a space necessary for the wiring of the optical fiber. The immunity from a thermal neutron was calculated based on the amount of $B_4C$ powder. As a result, it was confirmed to decrease up to transmittance of 10%.

In this Embodiment, two optical fibers led out from the neutron detecting element are collected on one side of the cylinder for neutron detecting element arrangement and then the detection processing is carried out. Therefore, the light shielding is provided on one side of the cylinder by using an aluminum board. The space in the cylinder of the neutron detecting element is used as a conduit for optical fibers. Each of two optical fibers is led to the multichannel optical detector, arranged in one side of the cylinder for neutron detecting element arrangement. Finally, the size of the cylinder for neutron detecting element arrangement of the one-dimensional neutron detector of this Embodiment became 25 mm in the diameter and 607 mm in length. The effective detection area is the size of 22 mm×607 mm.

Multi anode photomultiplier tube H7546 of 64 channels, made by Hamamatsu Photonics K.K, in which the sensitive area of one channel is 2 mm×2 mm and which is available in the photon counting is used as the multichannel optical detector. Moreover, because the gain of $2 \times 10^6$ can be obtained at the applied voltage 950V, the photon counting can be carried out enough. Because the fluorescence output from the wavelength shift fiber is very little, each fluorescence signal output from two photomultiplier tube tubes was processed by using the photon measurement method in this Embodiment.

Each photon signal output from a photomultiplier tube is amplified by a photon signal amplifier composed of a high-speed IC amplifier, and then it is converted into a photon digital pulse signal by a photon signal discrimination circuit composed of the discriminator circuit.

The photon signal amplifier comprises an amplifier with the performance of 60 times the gain in band width 200 MHz, composed by using two AD8001 high-speed IC amplifiers made by Analog Devices Inc. for each circuit. The photon signal discrimination circuit was composed by using AD8611 made by Analog Devices Inc. as high-speed discriminator IC. It is possible to make a photon digital pulse signal having a pulse time width of about 5 ns as a signal of one photon by using the electronic circuit composed like this.

Next, the photon digital pulse signal generated by the photon output from each photomultiplier tube is taken out from a synchronization signalizing circuit comprised of gate circuits as a synchronization photon signal synchronized with a clock pulse by using the clock pulse of the width which equals to the pulse time width of the photon digital pulse signal. The frequency of the clock pulse is assumed to be 100 MHz which generates the same pulse time width as 5 ns pulse time width of the photon digital pulse signal.

The count is started based on a start time signal which is a photon digital pulse signal input first to a photon digital counter circuit, and carried out during the counting time which corresponds to the coincidence time in the general coincidence circuit. Photon integral value which corresponds to two optical fibers is obtained by using two circuits mentioned above. When an integral value more than the predetermined photon discrimination value is obtained from both circuits during the counting time, a neutron signal is output. In this Embodiment, a photon discrimination value set corresponding to each photomultiplier tube is five photons.

In this Embodiment, the counting time is set to the width of time of 5 μs in order to use fluorescence emitted from the ZnS:Ag phosphor at incidence of neutron effectively.

Neutron one-dimensional image data is acquired by reducing the final signal output number by pairing two optical fibers led out from each neutron detecting element and performing the above-mentioned signal processing, and causing the output neutron incidence signal to be five bit data as position information in order of the arrangement of the neutron detecting elements, and then sending them to the neutron image processing apparatus.

The neutron detection efficiency of this one-dimensional neutron detector was measured by using the californium radiation source as a neutron source. The configuration of the apparatus for the evaluation test is shown in FIG. 13. The counting distribution to the thermal neutron of this one-dimensional neutron detector was measured by using the californium neutron source after the cadmium neutron shield had been removed first. The one-dimensional neutron detector was positioned from the moderator system of the californium radiation source to 50 cm remote place so that the neutron beam might almost become parallel. The result of the counting distribution measurement is shown in FIG. 14. It was confirmed to be able to make the one-dimensional neutron detector because the distribution of the neutron was able to be measured by this detector though the counting value depends on the quality of the production of the neutron detecting element and changes because of the first trial production.

Next, after surroundings of the central part of the one-dimensional neutron detector had been covered with a cadmium board of 0.7 mm in thickness and 225 mm in length, the position detection characteristic was measured. The result of the normalized counting value distribution is shown in FIG. 15, where the result of the counting value measurement corresponding to each neutron detecting element is normalized by the result of the counting value measurement when the neutron detector is not covered with the cadmium neutron shield. The normalized counting value in the part not covered is about 0.2 because the counting time of this measurement is the time of ⅕ of measuring time when the cadmium neutron shield is removed.

It was confirmed that the detector according to the present invention is available enough as the one-dimensional neutron detector from the above-mentioned result.

Basically, the neutron detecting element of the present invention comprises: an inner cylindrical neutron scintillator where a neutron detection body is arranged outside of the cylindrical substrate;

a scintillator fluorescence detection body made by placing coiled wavelength shift fibers where two wavelength shift fibers are wound in parallel along the cylindrical substrate on an inner cylindrical neutron scintillator; and an outer cylindrical neutron scintillator where a neutron detection body is arranged inside of the cylindrical substrate, the outer cylindrical neutron scintillator being arranged on the scintillator fluorescence detection body.

In this structure, the neutron incident on the neutron detecting element is detected by 4 neutron scintillators. Therefore, when the neutron scintillator with the detection efficiency of 40% to the thermal neutron is used, it becomes possible to obtain ideally a high detection efficiency of 87%, and thus the detection efficiency equal with that of the current 6 atmospheric pressure one inch position-sensitive $^3$He gas proportional counter can be obtained.

The cylindrical neutron detector which can detect neutrons one-dimensionally is realized by arranging the neutron detecting elements in close proximity to each other in the cylinder for neutron detecting element arrangement, wiring optical fibers inside of the cylinder for the neutron scintillator, and leading them to the optical detector. Because this neutron detector has the cylindrical body and almost the same neutron detection efficiency as the positional sensitive $^3$He gas proportional counter, it becomes $^3$He substitution neutron detector in the meaning of the truth.

What is claimed is:

1. A neutron detector, comprising:
   a cylinder; and
   a neutron detector element inside the cylinder, wherein the neutron detector element comprises:
      an inner cylindrical neutron scintillator that includes a cylindrical substrate and a neutron detection body arranged outside of the cylindrical substrate;
      a scintillator fluorescence detection body made by placing coiled wavelength shift fibers, where two wavelength shift fibers are wound in parallel on said inner cylindrical neutron scintillator; and
      an outer cylindrical neutron scintillator that includes a cylindrical substrate and a neutron detection body arranged inside of the cylindrical substrate of the outer cylindrical neutron scintillator;
   the outer cylindrical neutron scintillator being arranged over the scintillator fluorescence detection body,
   wherein said neutron detection body includes a ZnS phosphor, and a neutron converter material containing $^6$Li or $^{10}$B; and
   wherein a space within the cylinder is used as a conduit for optical fibers connected to the wavelength shift fibers; whereby the fluorescence signals converted into pulse signals by two optical detectors are led to a coincidence circuit, and when two fluorescence signals are measured simultaneously during the predetermined period of time, a neutron signal is output.

2. The neutron detector according to claim 1, wherein two or more neutron detecting elements are arranged in close proximity to each other in the cylinder, a space within a cylinder of each of the neutron detecting elements is used as a conduit for the optical fibers connected to the wavelength shift fibers, and two optical fibers are led to two optical detectors, arranged on one side or both sides of the cylinder.

3. The neutron detector according to claim 1,
   wherein two or more neutron detecting elements are arranged in close proximity to each other in the cylinder, a space within a cylinder of each of the neutron detecting elements is used as a conduit for the optical fibers connected to the wavelength shift fibers, and two optical fibers are led to two multichannel optical detectors, arranged on one side or both sides of the cylinder, each fluorescence is detected by the two multichannel optical detectors, using the optical fibers which are led out from each neutron detecting element as a pair, and the fluorescence signals converted into pulse signals by the two multichannel optical detectors are led to a coincidence circuit, whereby when two fluorescence signals are measured simultaneously during the predetermined period of time, a neutron signal is output.

4. The neutron detector according to claim 1, wherein two or more neutron detecting elements are arranged in close proximity to each other in the cylinder, a space within a cylinder of each of the neutron detecting elements is used as a conduit for the optical fibers connected to the wavelength shift fibers, and two optical fibers are led to two multichannel optical detectors, arranged on one side or both sides of the cylinder, two optical fibers from each of the neutron detecting elements are connected optically with each of the multichannel optical detectors based on a predetermined coding rule, the fluorescence emitted when the neutron is incident to the neutron scintillator and is captured therein is detected by two wavelength shift fibers, and the fluorescence of which the wavelength is shifted is detected by the multichannel optical detectors based on the coding rule, the fluorescence signal converted into the pulse signal by each of the multichannel optical detectors is led to the multichannel coincidence circuit, the two multichannel optical detectors which two signals were measured simultaneously during the predetermined period of time are specified, and the position of incidence of neutron to said neutron detecting elements arranged in the cylinder is decided based on the coding rule.

\* \* \* \* \*